United States Patent
Stiansen

(10) Patent No.: US 9,923,914 B2
(45) Date of Patent: Mar. 20, 2018

(54) SYSTEMS AND PLATFORMS FOR INTELLIGENTLY MONITORING RISKY NETWORK ACTIVITIES

(71) Applicant: Norse Networks, Inc., St. Louis, MO (US)

(72) Inventor: Tommy Stiansen, Hillsborough, CA (US)

(73) Assignee: NORSE NETWORKS, INC., St. Louis, MO (US)

( * ) Notice: Subject to any disclaimer, the term of this patent is extended or adjusted under 35 U.S.C. 154(b) by 0 days.

(21) Appl. No.: 15/197,567

(22) Filed: Jun. 29, 2016

(65) Prior Publication Data

US 2017/0006054 A1 Jan. 5, 2017

Related U.S. Application Data

(60) Provisional application No. 62/187,083, filed on Jun. 30, 2015.

(51) Int. Cl.
*H04L 29/06* (2006.01)

(52) U.S. Cl.
CPC ...... *H04L 63/1425* (2013.01); *H04L 63/1416* (2013.01); *H04L 63/1433* (2013.01); *G06F 2221/2111* (2013.01)

(58) Field of Classification Search
CPC ............. H04L 63/1408; H04L 63/1483; H04L 63/1491; G06F 17/30864
See application file for complete search history.

(56) References Cited

U.S. PATENT DOCUMENTS

| | | | |
|---|---|---|---|
| 7,451,489 B2 | 11/2008 | Cantrell et al. | |
| 7,490,356 B2 | 2/2009 | Lieblich et al. | |
| 7,543,740 B2 * | 6/2009 | Greene | G06Q 20/40 235/375 |
| 7,708,200 B2 * | 5/2010 | Helsper | G06Q 30/06 235/380 |
| 7,721,336 B1 | 5/2010 | Adjaoute | |
| 7,823,202 B1 * | 10/2010 | Nucci | H04L 45/00 709/224 |
| 7,835,361 B1 * | 11/2010 | Dubrovsky | H04L 12/2874 370/394 |
| 7,890,627 B1 * | 2/2011 | Thomas | G06Q 10/107 709/206 |
| 7,904,959 B2 * | 3/2011 | Sidiroglou | G06F 21/554 726/22 |
| 7,913,303 B1 * | 3/2011 | Rouland | H04L 63/1433 726/22 |
| 7,937,480 B2 * | 5/2011 | Alperovitch | H04L 51/12 709/206 |

(Continued)

OTHER PUBLICATIONS

Co-pending U.S. Appl. No. 29/519,137, filed Mar. 2, 2015.

(Continued)

*Primary Examiner* — James Turchen
(74) *Attorney, Agent, or Firm* — Wilson, Sonsini, Goodrich & Rosati

(57) ABSTRACT

Technology for improving and monitoring data communication security is presented herein. The technology monitors a plurality of sources of risky activities, crawls on computer networks to scan the risky activities, visualizes the risky activities, and detects and prevents risky activities.

28 Claims, 18 Drawing Sheets

(56) References Cited

U.S. PATENT DOCUMENTS

| | | | |
|---|---|---|---|
| 7,953,852 B2* | 5/2011 | Chandrashekar | H04L 63/1441 345/60 |
| D649,973 S | 12/2011 | Matas | |
| 8,132,260 B1 | 3/2012 | Mayer et al. | |
| 8,201,257 B1 | 6/2012 | Andres et al. | |
| 8,260,914 B1* | 9/2012 | Ranjan | H04L 61/1511 709/224 |
| 8,468,606 B2 | 6/2013 | Van De Weyer et al. | |
| 8,478,708 B1* | 7/2013 | Larcom | G06Q 10/10 706/52 |
| 8,495,746 B2 | 7/2013 | Fissel et al. | |
| 8,516,590 B1* | 8/2013 | Ranadive | H04L 63/1433 713/187 |
| 8,533,842 B1* | 9/2013 | Satish | H04L 63/20 726/22 |
| 8,533,844 B2 | 9/2013 | Mahaffey et al. | |
| 8,726,379 B1* | 5/2014 | Stiansen | H04L 63/1491 726/22 |
| 8,832,832 B1 | 9/2014 | Visbal | |
| 8,984,649 B2 | 3/2015 | Ryan | |
| D740,842 S | 10/2015 | Liu et al. | |
| 9,160,764 B2 | 10/2015 | Stiansen et al. | |
| D747,329 S | 1/2016 | Lessin et al. | |
| 9,294,498 B1* | 3/2016 | Yampolskiy | H04L 63/1433 |
| 9,317,680 B2* | 4/2016 | Carter, III | G06F 21/51 |
| 2007/0299777 A1* | 12/2007 | Shraim | G06Q 10/107 705/51 |
| 2008/0080518 A1* | 4/2008 | Hoeflin | H04L 63/1416 370/395.42 |
| 2008/0262991 A1 | 10/2008 | Kapoor et al. | |
| 2008/0307526 A1* | 12/2008 | Chung | H04L 63/1416 726/23 |
| 2013/0133072 A1* | 5/2013 | Kraitsman | H04L 63/1408 726/23 |
| 2014/0007017 A1 | 1/2014 | Sternfeld et al. | |
| 2014/0067656 A1* | 3/2014 | Cohen Ganor | G06Q 50/01 705/39 |
| 2014/0189864 A1* | 7/2014 | Wang | G06F 21/51 726/23 |
| 2015/0170288 A1 | 6/2015 | Harton et al. | |
| 2015/0237061 A1* | 8/2015 | Shraim | H04L 63/1425 726/22 |
| 2015/0261955 A1* | 9/2015 | Huang | G06F 21/562 726/23 |
| 2015/0271193 A1* | 9/2015 | Estes | H04L 63/1416 726/23 |
| 2015/0288711 A1 | 10/2015 | Jorgensen | |
| 2015/0347545 A1 | 12/2015 | Parent et al. | |
| 2015/0373044 A1 | 12/2015 | Stiansen et al. | |
| 2016/0044054 A1 | 2/2016 | Stiansen et al. | |
| 2016/0099962 A1* | 4/2016 | Peach | H04L 63/1433 726/25 |
| 2016/0182556 A1* | 6/2016 | Tatourian | G06F 21/554 726/25 |
| 2016/0337315 A1 | 11/2016 | Maestas | |

OTHER PUBLICATIONS

Co-pending U.S. Appl. No. 29/524595, filed Apr. 21, 2015.
U.S. Appl. No. 13/550,354 Office Action dated Oct. 25, 2013.
U.S. Appl. No. 14/224,822 Office Action dated Jan. 7, 2015.
U.S. Appl. No. 14/632,514 Office Action dated Jan. 21, 2016.
U.S. Appl. No. 14/632,514 Office Action dated Jul. 15, 2015.
U.S. Appl. No. 14/842,603 Office Action dated Apr. 22, 2016.
U.S. Appl. No. 29/519,137 Office Action dated Mar. 23, 2016.
Co-pending U.S. Appl. No. 29/571,962, filed Jul. 22, 2016.
U.S. Appl. No. 14/842,603 Office Action dated Aug. 25, 2016.

* cited by examiner

SYSTEMS AND PLATFORMS FOR INTELLIGENTLY MONITORING RISKY NETWORK ACTIVITIES

CROSS-REFERENCE TO RELATED APPLICATIONS

The present application claims the benefit of U.S. Provisional Application No. 62/187,083, filed on Jun. 30, 2015, the entire contents of which are incorporated herein by reference.

BACKGROUND OF THE INVENTION

Every computer connected to the Internet is connected in some fashion to every other computer connected to the Internet, and all of these computers are capable of communicating with each other through various layers of network communications protocols. These protocols differ widely at the physical level. However, adverse activities can harm the packets during communications. To guarantee successful and secure communications, reliable methods for preventing risky network activities is necessary. Moreover, risky network activities (e.g., spams, virus, malware, etc.) nowadays are smart and adaptive, so intelligent methods to monitor and prevent the activities are desirable.

SUMMARY OF THE INVENTION

The technology disclosed herein is able to monitor risky activities, crawling computer networks, including private and public networks, as necessary. Furthermore, aggregating information of risky activities from various sources is more than helpful. The monitoring can be performed at each network layer, including physical, data, network, transport, session, presentation, and application layers. The monitoring facilitates successful completion of network managers' duties.

Traditional anti-virus technologies merely perform a scan in the background and present detected activity as a summary table. In contrast, the technology disclosed herein includes a visualization module to visualize detailed information derived from detection of risky activities. The risk monitoring disclosed herein actively analyzes sources (e.g., domain names, IP addresses, and/or URLs) associated with any risky activities. Displaying risky activities, the sources, or both is desirable for a system manager to gain a global view on current security condition of his/her managed computer network and an external computer network. Nevertheless, there are a large number of risky activities, risky sources, and potential threats. The technology disclosed herein provides an efficient way to visualize and explore the information of risky activities and risky sources. A visualization system disclosed herein can display detailed information of a risky source, such as a range of IP addresses, an organization, a domain name, a disguised domain name, an Internet service provider, a city, a state/province, a country, and/or a risky activity/case detected. Further, the visualization system provides a search tool to enable a user to explore risky activities and risky sources of interest, where the search can based on an IP address, an organization, a domain name, a disguised domain name, an Internet service provider, a city, a state/province, a country, and/or a risky activity. In addition, specific information of risky sources can be visualized; for example, a context, a malware condition, a passive DNS, a crawling condition, a honeypot attack flow, honeypot attack traffic, an analyst note, documents/webpages/videos/binaries/files being crawled, routing, advertisements, un-advertisements, ASN records, virus/malware summary (e.g., counts, past history, etc.), TCP/IP port, and OSI network layers can be visualized. Overall, a user of the technology can achieve a better view of a computer network and potential threats to the network.

In one aspect, disclosed herein is a computing system for improving data communication security, the system comprising: (a) a digital signal processor comprising a memory device and an operating system configured to perform executable instructions; (b) a computer readable medium storing instructions executed by the digital signal processor to provide an application, the application comprising: (1) a monitoring module configured to (i) receive a plurality of sources of risky activities; and (ii) crawl on a computer network to scan the risky activities taking place on the computer network; (2) a visualization module configured to visualize the risky activities or the plurality of sources; and (3) a detection module configured to detect the risky activities. In some embodiments, the plurality of sources comprises one or more domain names. In some embodiments, the plurality of sources comprises one or more domain name systems. In some embodiments, the plurality of sources comprises one or more passive domain systems. In some embodiments, the plurality of sources comprises one or more Internet protocol addresses. In some embodiments, the plurality of sources comprises one or more webpages. In some embodiments, the plurality of sources comprises one or more geolocations. In some embodiments, the plurality of sources comprises one or more honeypots. In some embodiments, the plurality of sources comprises one or more documents. In some embodiments, the plurality of sources comprises one or more files. In some embodiments, the plurality of sources comprises one or more network ports. In some embodiments, the plurality of sources comprises one or more previously detection results. In some embodiments, the plurality of sources of the risky activities is transmitted to the system from a website. In some embodiments, the plurality of sources of the risky activities is transmitted to the system from a website. In some embodiments, the plurality of sources of the risky activities is transmitted to the system from a honey pot. In some embodiments, the plurality of sources of the risky activities is provided by a user. In some embodiments, the plurality of sources of the risky activities is inferred automatically from past risky activities. In some embodiments, the risky activities comprise one or more of the following: virus, virus distribution, phishing, intrusion, an attack, malware, threat, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication. In some embodiments, the risky activities comprise a series of risky activities. In some embodiments, the computer network comprises one or more social networking media. In some embodiments, the computer network comprises an enterprise computer network. In some embodiments, the computer network comprises a public computer network. In some embodiments, the visualization module is further configured to visualize the risky activities or the plurality of sources in a geolocation. In some embodiments, the visualization module is further configured to visualize the risky activities or the plurality of sources in a network layer. In some embodiments, the detection module is further configured to identify an indicator of compromise of the risky activities. In some embodiments, the detection module is further configured to prevent the risky activities. In some embodiments, the detection module is further configured to remove the risky activities. In some embodiments, the detection module comprises a search engine. In some embodiments, the search engine is configured to use a hash function to find risky activities. In some embodiments, the search engine is configured to use a file name to find risky activities. In some embodiments, the search engine is configured to use a uniform resource identifier (URL) to find risky activities. In some embodiments, the search engine is configured to use a keyword to find risky activities. In some embodiments, the search engine is configured to find risky activities in a local geolocation. In some embodiments, the search engine is configured to find risky activities on a local network. In some embodiments, the search engine is configured to find risky activities on a virtual network. In some embodiments, the system further comprises one or more sensors. In some embodiments, the monitoring module is configured to receive a sensor signal from the one or more sensors. In some embodiments, the sensor signal comprises a local risky activity. In some embodiments, the application further comprises a recording module. In some embodiments, the recording module is configured to record past risky activities. In some embodiments, the recording module is configured to record detection results. In some embodiments, the recording module is configured to record routing of risky activities. In some embodiments, the recording module is configured to record context of risky activities into data sets. In some embodiments, the recording module is configured to record social context of risky activities.

In another aspect, disclosed herein are non-transitory computer-readable storage media encoded with a computer program including instructions executable by a processor to create an application, the application comprising: (a) a monitoring module configured to (1) receive a plurality of sources of risky activities; and (2) crawl on a computer network to scan the risky activities taking place on the computer network; (b) a visualization module configured to visualize the risky activities or the plurality of sources; and (c) a detection module configured to detect the risky activities. In some embodiments, the plurality of sources comprises one or more domain names. In some embodiments, the plurality of sources comprises one or more domain name systems. In some embodiments, the plurality of sources comprises one or more passive domain systems. In some embodiments, the plurality of sources comprises one or more Internet protocol addresses. In some embodiments, the plurality of sources comprises one or more webpages. In some embodiments, the plurality of sources comprises one or more geolocations. In some embodiments, the plurality of sources comprises one or more honeypots. In some embodiments, the plurality of sources comprises one or more documents. In some embodiments, the plurality of sources comprises one or more files. In some embodiments, the plurality of sources comprises one or more network ports. In some embodiments, the plurality of sources comprises one or more previously detection results. In some embodiments, the plurality of sources of the risky activities is transmitted to the system from a website. In some embodiments, the plurality of sources of the risky activities is transmitted to the system from a website. In some embodiments, the plurality of sources of the risky activities is transmitted to the system from a honey pot. In some embodiments, the plurality of sources of the risky activities is provided by a user. In some embodiments, the plurality of sources of the risky activities is inferred automatically from past risky activities. In some embodiments, the risky activities comprise one or more of the following: virus, virus distribution, phishing, intrusion, an attack, malware, threat, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication. In some embodiments, the risky activities comprise a series of risky activities. In some embodiments, the computer network comprises one or more social networking media. In some embodiments, the computer network comprises an enterprise computer network. In some embodiments, the computer network comprises a public computer network. In some embodiments, the visualization module is further configured to visualize the risky activities or the plurality of sources in a geolocation. In some embodiments, the visualization module is further configured to visualize the risky activities or the plurality of sources in a network layer. In some embodiments, the detection module is further configured to identify an indicator of compromise of the risky activities. In some embodiments, the detection module is further configured to prevent the risky activities. In some embodiments, the detection module is further configured to remove the risky activities. In some embodiments, the detection module comprises a search engine. In some embodiments, the search engine is configured to use a hash function to find risky activities. In some embodiments, the search engine is configured to use a file name to find risky activities. In some embodiments, the search engine is configured to use a uniform resource identifier (URL) to find risky activities. In some embodiments, the search engine is configured to use a keyword to find risky activities. In some embodiments, the search engine is configured to find risky activities in a local geolocation. In some embodiments, the search engine is configured to find risky activities on a local network. In some embodiments, the search engine is configured to find risky activities on a virtual network. In some embodiments, the media further comprise a communication module communicating with one or more sensors. In some embodiments, the monitoring module is configured to receive a sensor signal from the one or more sensors. In some embodiments, the sensor signal comprises a local risky activity. In some embodiments, the application further comprises a recording module. In some embodiments, the recording module is configured to record past risky activities. In some embodiments, the recording module is configured to record detection results. In some embodiments, the recording module is configured to record routing of risky activities. In some embodiments, the recording module is configured to record context of risky activities into data sets. In some embodiments, the recording module is configured to record social context of risky activities. In some embodiments, the application is offered as software as a service.

In another aspect, disclosed herein is a computing system for improving data communication security, the system comprising (a) a digital processing device comprising a memory device and an operating system configured to perform executable instructions; and (b) a computer readable medium storing instructions executed by the digital processing device to provide an application, the application comprising: (1) a monitoring module configured to (i) receive a plurality of sources of risky activities; and (ii) crawl a social network to scan the risky activities taking place on the social network; (2) a visualization module configured to visualize the risky activities on the social network; and (3) a detection module configured to detect the risky activities. In some embodiments, the plurality of sources comprises one or more domain names. In some embodiments, the plurality of sources comprises one or more domain name systems. In some embodiments, the plurality of sources comprises one or more passive domain systems. In some embodiments, the plurality of sources comprises one or more Internet protocol addresses. In some embodiments, the plurality of sources comprises one or more webpages. In some embodiments, the plurality of sources comprises one or more geolocations. In some embodiments, the plurality of sources comprises one or more honeypots. In some embodiments, the plurality of sources comprises one or more documents. In some embodiments, the plurality of sources comprises one or more files. In some embodiments, the plurality of sources comprises one or more network ports. In some embodiments, the plurality of sources comprises one or more previously detection results. In some embodiments, the plurality of sources of the risky activities is transmitted to the system from a website. In some embodiments, the plurality of sources of the risky activities is transmitted to the system from a website. In some embodiments, the plurality of sources of the risky activities is transmitted to the system from a honey pot. In some embodiments, the plurality of sources of the risky activities is provided by a user. In some embodiments, the plurality of sources of the risky activities is inferred automatically from past risky activities. In some embodiments, the risky activities comprise one or more of the following: virus, virus distribution, phishing, intrusion, an attack, malware, threat, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication. In some embodiments, the risky activities comprise a series of risky activities. In some embodiments, the visualization module is further configured to visualize the risky activities or the plurality of sources in a geolocation. In some embodiments, the visualization module is further configured to visualize the risky activities or the plurality of sources in a network layer. In some embodiments, the detection module is further configured to identify an indicator of compromise of the risky activities. In some embodiments, the detection module is further configured to prevent the risky activities. In some embodiments, the detection module is further configured to remove the risky activities. In some embodiments, the detection module comprises a search engine. In some embodiments, the search engine is configured to use a hash function to find risky activities. In some embodiments, the search engine is configured to use a file name to find risky activities. In some embodiments, the search engine is configured to use a uniform resource identifier (URL) to find risky activities. In some embodiments, the search engine is configured to use a keyword to find risky activities. In some embodiments, the search engine is configured to find risky activities in a local geolocation. In some embodiments, the search engine is configured to find risky activities on a local network. In some embodiments, the search engine is configured to find risky activities on a virtual network. In some embodiments, the system further comprises one or more sensors. In some embodiments, the monitoring module is configured to receive a sensor signal from the one or more sensors. In some embodiments, the sensor signal comprises a local risky activity. In some embodiments, the application further comprises a recording module. In some embodiments, the recording module is configured to record past risky activities. In some embodiments, the recording module is configured to record detection results. In some embodiments, the recording module is configured to record routing of risky activities. In some embodiments, the recording module is configured to record context of risky activities into data sets. In some embodiments, the recording module is configured to record social context of risky activities. In some embodiments, the application is used by an owner of the social network. In some embodiments, the application is remotely used by an owner of the social network. In some embodiments, the application is used by a member of the social network. In some embodiments, the application is remotely used by a member of the social network.

In another aspect, disclosed herein is a computing system on a computer network for improving data communication security, the system comprising (a) one or more sensors configured to detect local risky activities on one or more local networks of the computer network; (b) a digital processing device comprising a memory device and an operating system configured to perform executable instructions; (c) a computer readable medium storing instructions executed by the digital processing device to provide an application, the application comprising: (1) a monitoring module configured to (i) receive a plurality of sources of risky activities; and (ii) receive the local risky activities; and (2) visualization module configured to visualize the local risky activities on the computer network. In some embodiments, the risky activities comprise one or more of the following: virus, virus distribution, phishing, intrusion, an attack, malware, threat, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication. In some embodiments, the risky activities comprise a series of risky activities. In some embodiments, the visualization module is further configured to visualize one or more geolocations of the risky activities. In some embodiments, the visualization module is further configured to visualize the risky activities in a network layer. In some embodiments, the one or more sensors are further configured to identify an indicator of compromise of the risky activities. In some embodiments, the one or more sensors are further configured to prevent the risky activities. In some embodiments, the one or more sensors are further configured to remove the risky activities. In some embodiments, the one or more sensors comprise one or more search engines. In some embodiments, the one or more search engines are configured to use a hash function to find the risky activities. In some embodiments, the one or more search engines are configured to use a file name to find the risky activities. In some embodiments, the one or more search engines are configured to use a uniform resource identifier (URL) to find the risky activities. In some embodiments, the one or more search engines are configured to use a keyword to find the risky activities. In some embodiments, the one or more search engines are configured to find the risky activities on a virtual network. In some embodiments, the one or more sensors comprise one or more of the following: one or more computing devices, one or more electronic devices, one or more network devices, one or more mobile devices, one or more appliances, and one or more communication devices.

In one aspect, disclosed herein is a computer-implemented method for improving data communication security, the method comprising: (1) monitoring, by a computer, a computer network, comprising (i) receiving a plurality of sources of risky activities; and (ii) crawling on the computer network to scan the risky activities taking place on the computer network; (2) visualizing, by a computer, the risky activities or the plurality of sources; and (3) detecting, by a computer, the risky activities. In some embodiments, the plurality of sources comprises one or more domain names. In some embodiments, the plurality of sources comprises one or more domain name systems. In some embodiments, the plurality of sources comprises one or more passive domain systems. In some embodiments, the plurality of sources comprises one or more Internet protocol addresses. In some embodiments, the plurality of sources comprises one or more webpages. In some embodiments, the plurality of sources comprises one or more geolocations. In some embodiments, the plurality of sources comprises one or more honeypots. In some embodiments, the plurality of sources comprises one or more documents. In some embodiments, the plurality of sources comprises one or more files. In some embodiments, the plurality of sources comprises one or more network ports. In some embodiments, the plurality of sources comprises one or more previously detection results. In some embodiments, the plurality of sources of the risky activities is transmitted to the system from a website. In some embodiments, the plurality of sources of the risky activities is transmitted to the system from a web site. In some embodiments, the plurality of sources of the risky activities is transmitted to the system from a honey pot. In some embodiments, the plurality of sources of the risky activities is provided by a user. In some embodiments, the plurality of sources of the risky activities is inferred automatically from past risky activities. In some embodiments, the risky activities comprise one or more of the following: virus, virus distribution, phishing, intrusion, an attack, malware, threat, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication. In some embodiments, the risky activities comprise a series of risky activities. In some embodiments, the computer network comprises one or more social networking media. In some embodiments, the computer network comprises an enterprise computer network. In some embodiments, the computer network comprises a public computer network. In some embodiments, the method further comprises visualizing the risky activities or the plurality of sources in a geolocation. In some embodiments, the method further comprises visualizing the risky activities or the plurality of sources in a network layer. In some embodiments, the detection further comprises identifying an indicator of compromise of the risky activities. In some embodiments, the detection further comprises preventing the risky activities. In some embodiments, the detection further comprises removing the risky activities. In some embodiments, the detection comprises using a search engine. In some embodiments, the search engine is configured to use a hash function to find risky activities. In some embodiments, the search engine is configured to use a file name to find risky activities. In some embodiments, the search engine is configured to use a uniform resource identifier (URL) to find risky activities. In some embodiments, the search engine is configured to use a keyword to find risky activities. In some embodiments, the search engine is configured to find risky activities in a local geolocation. In some embodiments, the search engine is configured to find risky activities on a local network. In some embodiments, the search engine is configured to find risky activities on a virtual network. In some embodiments, the method further comprises using one or more sensors. In some embodiments, the monitoring comprises receiving a sensor signal from the one or more sensors. In some embodiments, the sensor signal comprises a local risky activity. In some embodiments, the method further comprises recording. In some embodiments, the recording comprises recording past risky activities. In some embodiments, the recording comprises recording detection results. In some embodiments, the recording module comprises recording routing of risky activities. In some embodiments, the recording comprises recording context of risky activities into data sets. In some embodiments, the recording comprises recording social context of risky activities.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

Figure 4:
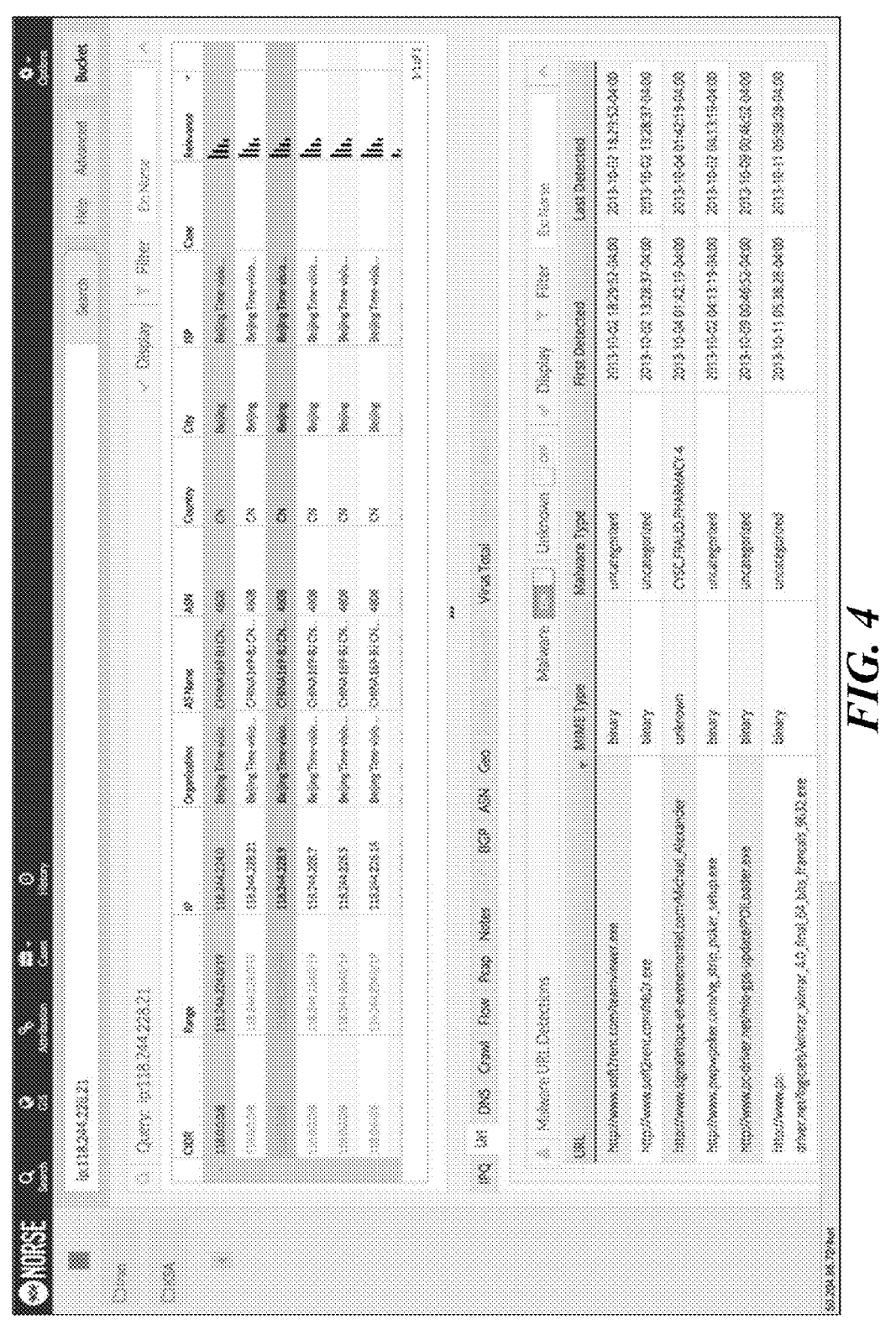

FIG. 4 shows an example of visualizing URL information; e.g., malware URLs detected on IP.

Figure 7:
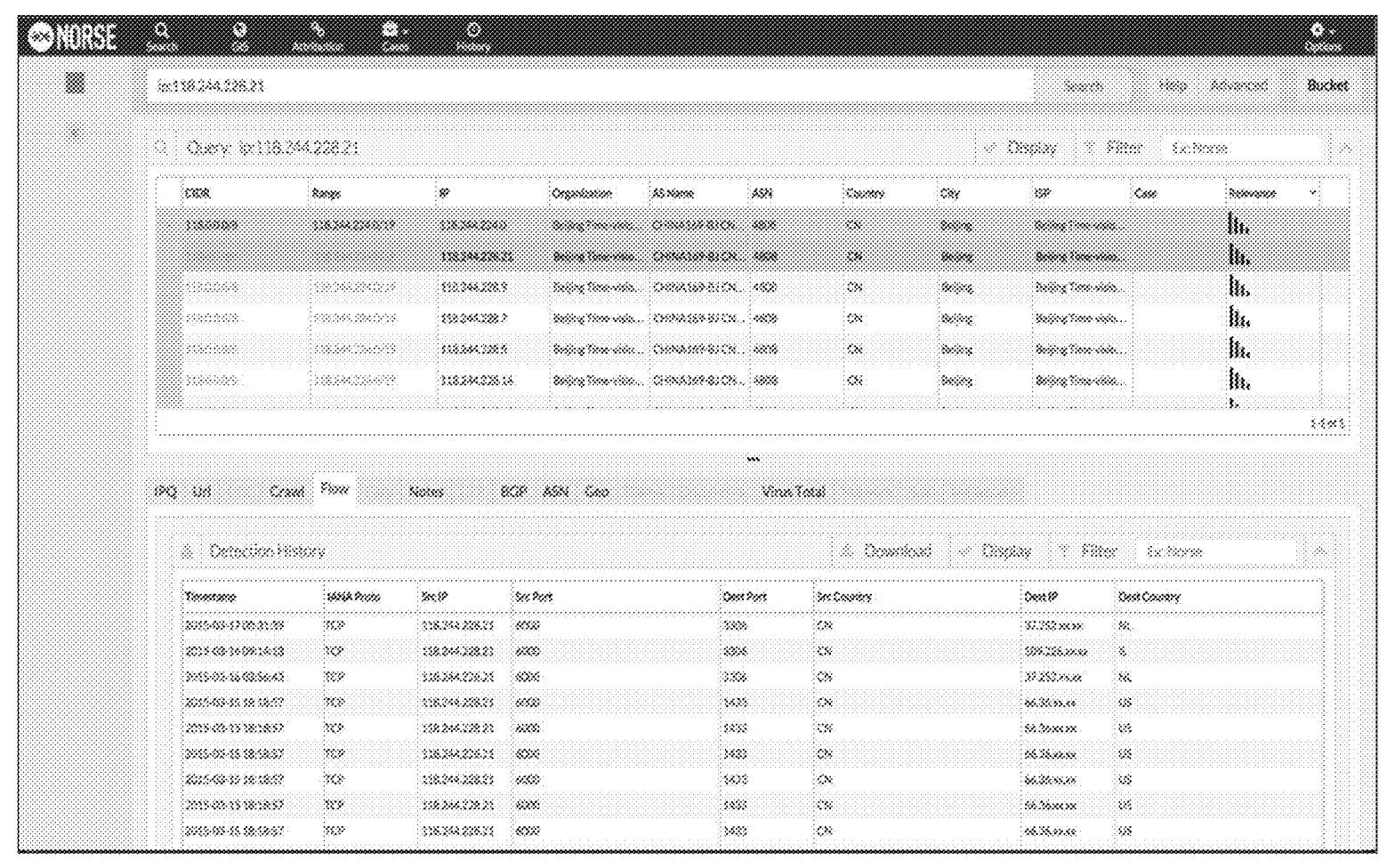

FIG. 7 shows an example of visualizing flows of attacks against honeypots on a computer network.

Figure 8:
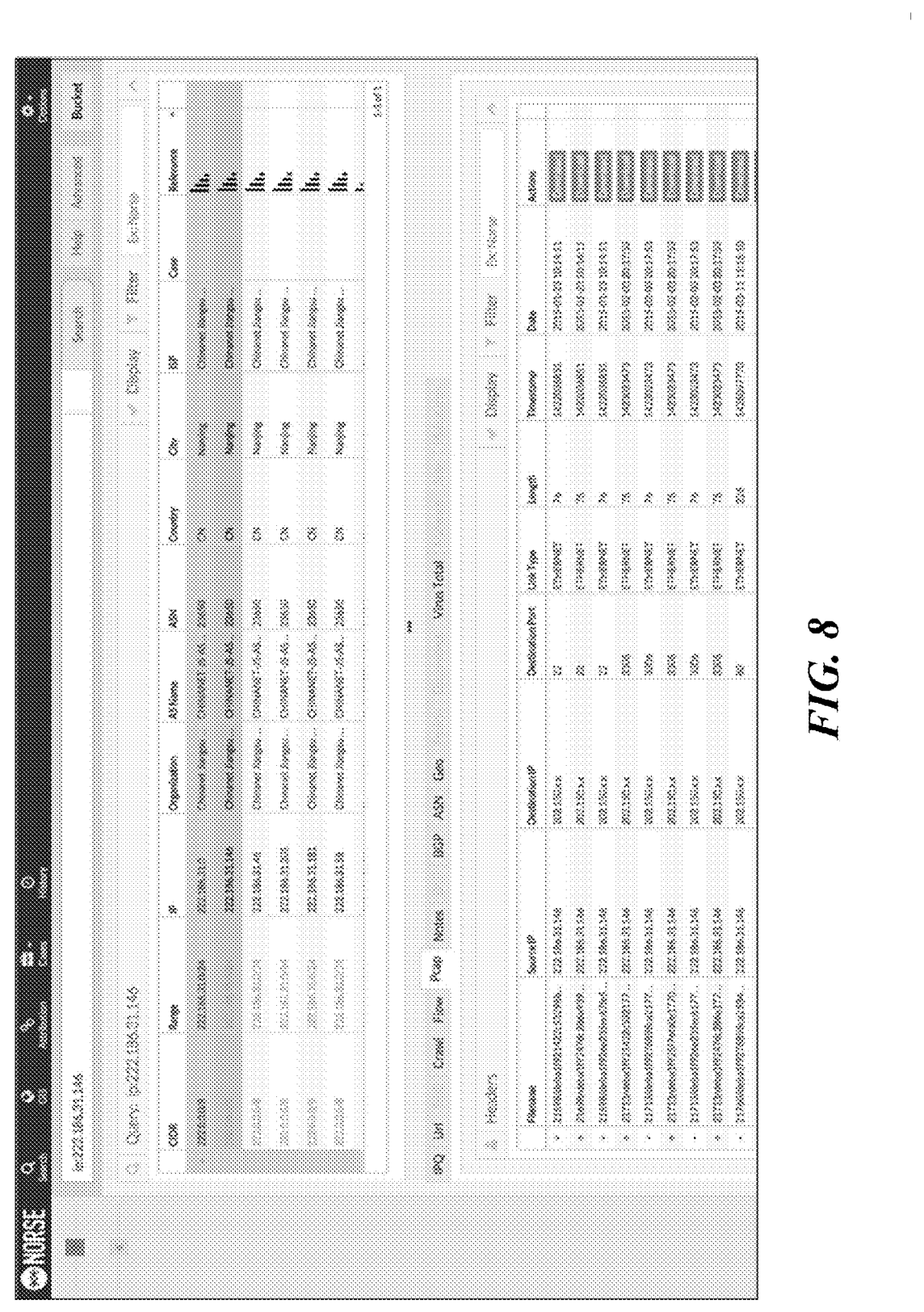

FIG. 8 shows an example of visualizing packet captures of attacks against honeypots on network.

Figure 9:
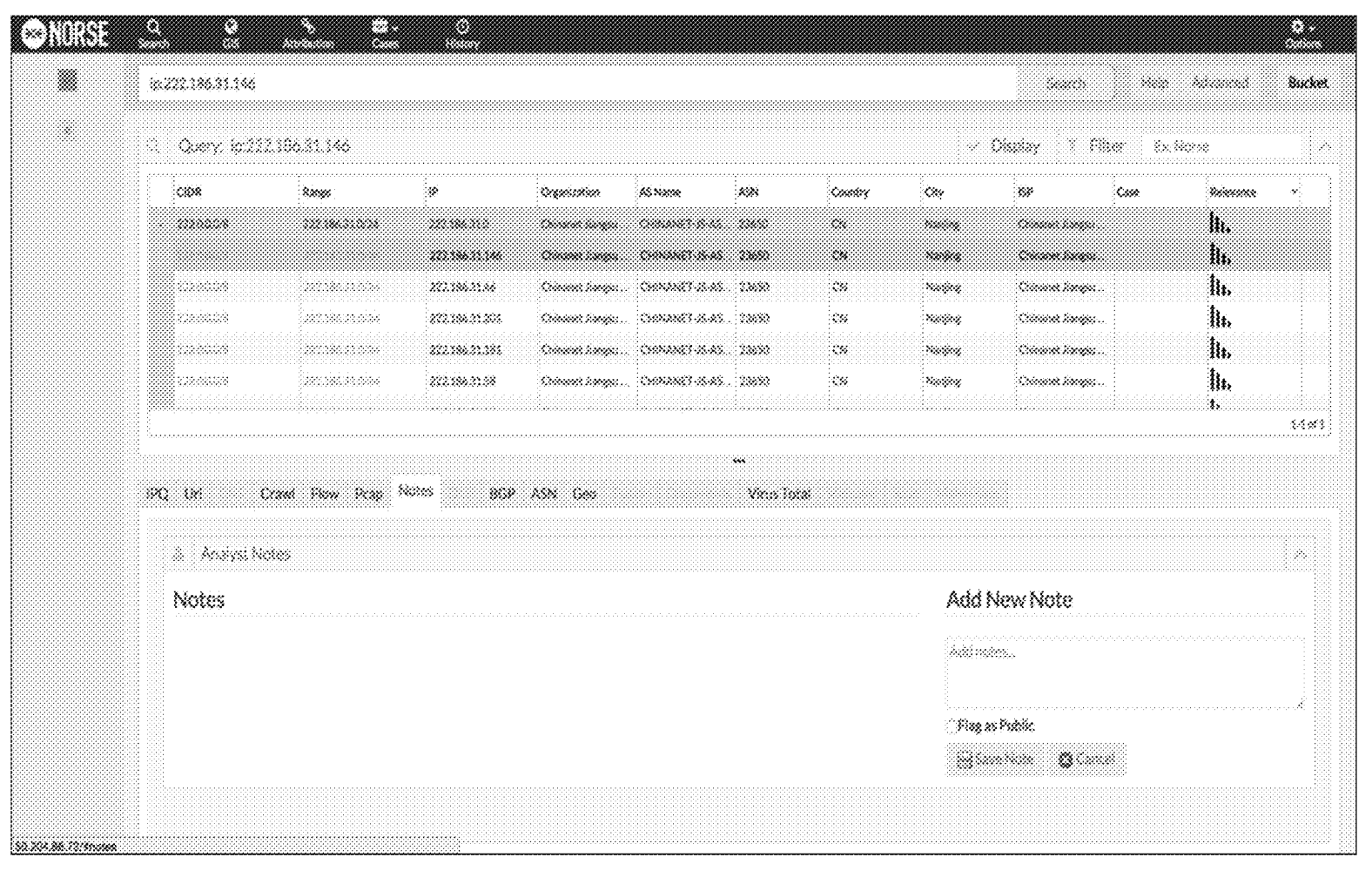

FIG. 9 shows an example of visualizing analyst notes.

Figure 11:
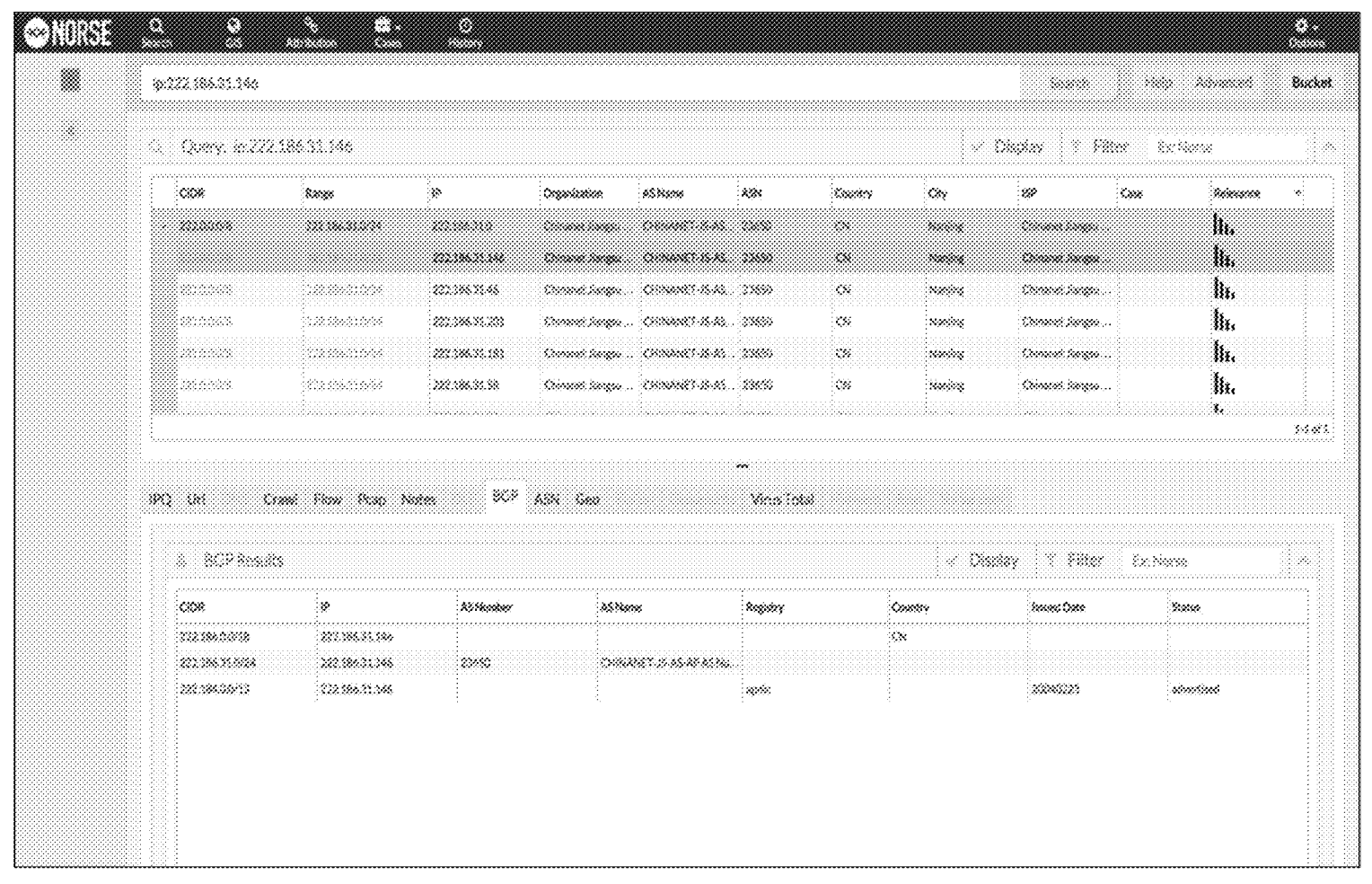

FIG. 11 shows an example of visualizing BGP route advertisements and un-advertisements.

FIG. 13 shows an example of visualizing IP geolocation.

FIG. 15 shows an example of visualizing various aspects of virus information and context.

DESCRIPTION OF THE PREFERRED EMBODIMENTS

Figure 1:
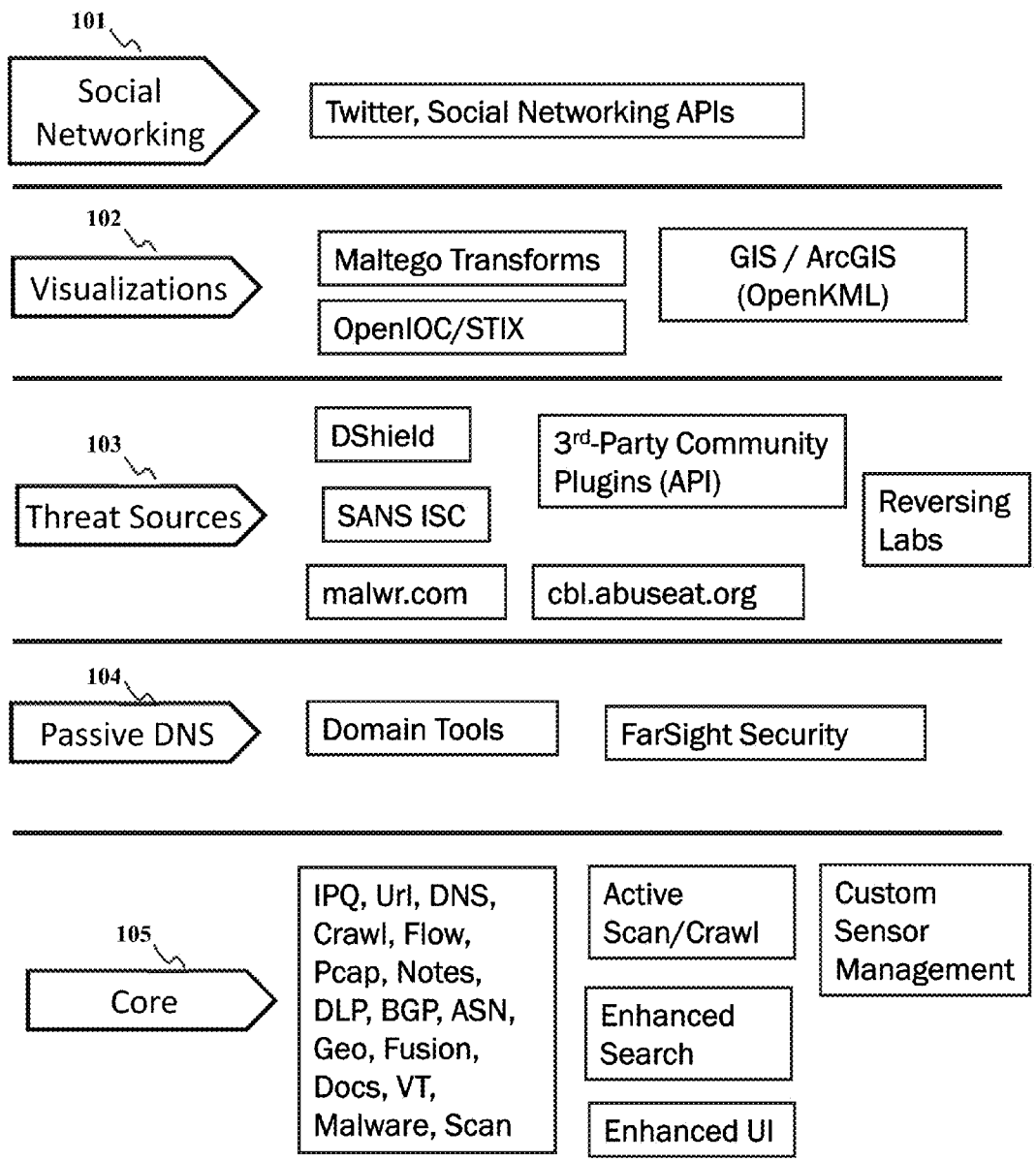
FIG. 1 shows an example system of the technology.

The subject matter disclosed herein includes a computing system which is installed on a computer network to monitor the inbound/outbound traffic without using a third-party service. In some embodiments, the inbound/outbound traffic comprises URLs. The system utilizes various intelligent algorithms to inspect data packets. When a risky activity is detected, the traffic is blocked or cleaned, and a system administrator is notified. Without using third-party inspection services, the data traffic is examined by the network appliance locally. The local inspection reduces the wandering time the data packets spend between the local network and the third-party inspection server. The reduced wandering time minimizes risk exposure. Furthermore, the system assists network administrators to precisely identify the true source of malicious activities. Automatic analysis and detection by the system reduce required manpower for network administration. Overall, network administrators manage networks in an easier way, and institutions will suffer much less loss.

In some embodiments, described herein includes computing system for improving data communication security, the system comprising: (a) a digital signal processor comprising a memory device and an operating system configured to perform executable instructions; (b) a computer readable medium storing instructions executed by the digital signal processor to provide an application, the application comprising: (1) a monitoring module configured to (i) receive a plurality of sources of risky activities; and (ii) crawl a computer network to scan the risky activities taking place on the computer network; (2) a visualization module configured to visualize the risky activities or the plurality of sources; and (3) a detection module configured to detect the risky activities. In some embodiments, the plurality of sources comprises one or more domain names. In some embodiments, the plurality of sources comprises one or more domain name systems. In some embodiments, the plurality of sources comprises one or more passive domain systems. In some embodiments, the plurality of sources comprises one or more Internet protocol addresses. In some embodiments, the plurality of sources comprises one or more webpages. In some embodiments, the plurality of sources comprises one or more geolocations. In some embodiments, the plurality of sources comprises one or more honeypots. In some embodiments, the plurality of sources comprises one or more documents. In some embodiments, the plurality of sources comprises one or more files. In some embodiments, the plurality of sources comprises one or more network ports. In some embodiments, the plurality of sources comprises one or more previously detection results. In some embodiments, the plurality of sources of the risky activities is transmitted to the system from a website. In some embodiments, the plurality of sources of the risky activities is transmitted to the system from a website. In some embodiments, the plurality of sources of the risky activities is transmitted to the system from a honey pot. In some embodiments, the plurality of sources of the risky activities is provided by a user. In some embodiments, the plurality of sources of the risky activities is inferred automatically from past risky activities. In some embodiments, the risky activities comprise one or more of the following: virus, virus distribution, phishing, intrusion, an attack, malware, threat, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication. In some embodiments, the risky activities comprise a series of risky activities. In some embodiments, the computer network comprises one or more social networking media. In some embodiments, the computer network comprises an enterprise computer network. In some embodiments, the computer network comprises a public computer network. In some embodiments, the visualization module is further configured to visualize the risky activities or the plurality of sources in a geolocation. In some embodiments, the visualization module is further configured to visualize the risky activities or the plurality of sources in a network layer. In some embodiments, the detection module is further configured to identify an indicator of compromise of the risky activities. In some embodiments, the detection module is further configured to prevent the risky activities. In some embodiments, the detection module is further configured to remove the risky activities. In some embodiments, the detection module comprises a search engine. In some embodiments, the search engine is configured to use a hash function to find risky activities. In some embodiments, the search engine is configured to use a file name to find risky activities. In some embodiments, the search engine is configured to use a uniform resource identifier (URL) to find risky activities. In some embodiments, the search engine is configured to use a keyword to find risky activities. In some embodiments, the search engine is configured to find risky activities in a local geolocation. In some embodiments, the search engine is configured to find risky activities on a local network. In some embodiments, the search engine is configured to find risky activities on a virtual network. In some embodiments, the system further comprises one or more sensors. In some embodiments, the monitoring module is configured to receive a sensor signal from the one or more sensors. In some embodiments, the sensor signal comprises a local risky activity. In some embodiments, the application further comprises a recording module. In some embodiments, the recording module is configured to record past risky activities. In some embodiments, the recording module is configured to record detection results. In some embodiments, the recording module is configured to record routing of risky activities. In some embodiments, the recording module is configured to record context of risky activities into data sets. In some embodiments, the recording module is configured to record social context of risky activities.

In some embodiments, described herein include non-transitory computer-readable storage media encoded with a computer program including instructions executable by a processor to create an application, the application comprising: (a) a monitoring module configured to (1) receive a plurality of sources of risky activities; and (2) crawl a computer network to scan the risky activities taking place on the computer network; (b) a visualization module configured to visualize the risky activities or the plurality of sources; and (c) a detection module configured to detect the risky activities. In some embodiments, the plurality of sources comprises one or more domain names. In some embodiments, the plurality of sources comprises one or more domain name systems. In some embodiments, the plurality of sources comprises one or more passive domain systems. In some embodiments, the plurality of sources comprises one or more Internet protocol addresses. In some embodiments, the plurality of sources comprises one or more webpages. In some embodiments, the plurality of sources comprises one or more geolocations. In some embodiments, the plurality of sources comprises one or more honeypots. In some embodiments, the plurality of sources comprises one or more documents. In some embodiments, the plurality of sources comprises one or more files. In some embodiments, the plurality of sources comprises one or more network ports. In some embodiments, the plurality of sources comprises one or more previously detection results. In some embodiments, the plurality of sources of the risky activities is transmitted to the system from a website. In some embodiments, the plurality of sources of the risky activities is transmitted to the system from a website. In some embodiments, the plurality of sources of the risky activities is transmitted to the system from a honey pot. In some embodiments, the plurality of sources of the risky activities is provided by a user. In some embodiments, the plurality of sources of the risky activities is inferred automatically from past risky activities. In some embodiments, the risky activities comprise one or more of the following: virus, virus distribution, phishing, intrusion, an attack, malware, threat, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication. In some embodiments, the risky activities comprise a series of risky activities. In some embodiments, the computer network comprises one or more social networking media. In some embodiments, the computer network comprises an enterprise computer network. In some embodiments, the computer network comprises a public computer network. In some embodiments, the visualization module is further configured to visualize the risky activities or the plurality of sources in a geolocation. In some embodiments, the visualization module is further configured to visualize the risky activities or the plurality of sources in a network layer. In some embodiments, the detection module is further configured to identify an indicator of compromise of the risky activities. In some embodiments, the detection module is further configured to prevent the risky activities. In some embodiments, the detection module is further configured to remove the risky activities. In some embodiments, the detection module comprises a search engine. In some embodiments, the search engine is configured to use a hash function to find risky activities. In some embodiments, the search engine is configured to use a file name to find risky activities. In some embodiments, the search engine is configured to use a uniform resource identifier (URL) to find risky activities. In some embodiments, the search engine is configured to use a keyword to find risky activities. In some embodiments, the search engine is configured to find risky activities in a local geolocation. In some embodiments, the search engine is configured to find risky activities on a local network. In some embodiments, the search engine is configured to find risky activities on a virtual network. In some embodiments, the media further comprise a communication module communicating with one or more sensors. In some embodiments, the monitoring module is configured to receive a sensor signal from the one or more sensors. In some embodiments, the sensor signal comprises a local risky activity. In some embodiments, the application further comprises a recording module. In some embodiments, the recording module is configured to record past risky activities. In some embodiments, the recording module is configured to record detection results. In some embodiments, the recording module is configured to record routing of risky activities. In some embodiments, the recording module is configured to record context of risky activities into data sets. In some embodiments, the recording module is configured to record social context of risky activities. In some embodiments, the application is offered as software as a service.

In various embodiments, described herein include a computing system for improving data communication security, the system comprising (a) a digital processing device comprising a memory device and an operating system configured to perform executable instructions; and (b) a computer readable medium storing instructions executed by the digital processing device to provide an application, the application comprising: (1) a monitoring module configured to (i) receive a plurality of sources of risky activities; and (ii) crawl a social network to scan the risky activities taking place on the social network; (2) a visualization module configured to visualize the risky activities on the social network; and (3) a detection module configured to detect the risky activities. In some embodiments, the plurality of sources comprises one or more domain names. In some embodiments, the plurality of sources comprises one or more domain name systems. In some embodiments, the plurality of sources comprises one or more passive domain systems. In some embodiments, the plurality of sources comprises one or more Internet protocol addresses. In some embodiments, the plurality of sources comprises one or more webpages. In some embodiments, the plurality of sources comprises one or more geolocations. In some embodiments, the plurality of sources comprises one or more honeypots. In some embodiments, the plurality of sources comprises one or more documents. In some embodiments, the plurality of sources comprises one or more files. In some embodiments, the plurality of sources comprises one or more network ports. In some embodiments, the plurality of sources comprises one or more previously detection results. In some embodiments, the plurality of sources of the risky activities is transmitted to the system from a website. In some embodiments, the plurality of sources of the risky activities is transmitted to the system from a website. In some embodiments, the plurality of sources of the risky activities is transmitted to the system from a honey pot. In some embodiments, the plurality of sources of the risky activities is provided by a user. In some embodiments, the plurality of sources of the risky activities is inferred automatically from past risky activities. In some embodiments, the risky activities comprise one or more of the following: virus, virus distribution, phishing, intrusion, an attack, malware, threat, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication. In some embodiments, the risky activities comprise a series of risky activities. In some embodiments, the visualization module is further configured to visualize the risky activities or the plurality of sources in a geolocation. In some embodiments, the visualization module is further configured to visualize the risky activities or the plurality of sources in a network layer. In some embodiments, the detection module is further configured to identify an indicator of compromise of the risky activities. In some embodiments, the detection module is further configured to prevent the risky activities. In some embodiments, the detection module is further configured to remove the risky activities. In some embodiments, the detection module comprises a search engine. In some embodiments, the search engine is configured to use a hash function to find risky activities. In some embodiments, the search engine is configured to use a file name to find risky activities. In some embodiments, the search engine is configured to use a uniform resource identifier (URL) to find risky activities. In some embodiments, the search engine is configured to use a keyword to find risky activities. In some embodiments, the search engine is configured to find risky activities in a local geolocation. In some embodiments, the search engine is configured to find risky activities on a local network. In some embodiments, the search engine is configured to find risky activities on a virtual network. In some embodiments, the system further comprises one or more sensors. In some embodiments, the monitoring module is configured to receive a sensor signal from the one or more sensors. In some embodiments, the sensor signal comprises a local risky activity. In some embodiments, the application further comprises a recording module. In some embodiments, the recording module is configured to record past risky activities. In some embodiments, the recording module is configured to record detection results. In some embodiments, the recording module is configured to record routing of risky activities. In some embodiments, the recording module is configured to record context of risky activities into data sets. In some embodiments, the recording module is configured to record social context of risky activities. In some embodiments, the application is used by an owner of the social network. In some embodiments, the application is remotely used by an owner of the social network. In some embodiments, the application is used by a member of the social network. In some embodiments, the application is remotely used by a member of the social network.

In various embodiments, described herein include a computing system on a computer network for improving data communication security, the system comprising (a) one or more sensors configured to detect local risky activities on one or more local networks of the computer network; (b) a digital processing device comprising a memory device and an operating system configured to perform executable instructions; (c) a computer readable medium storing instructions executed by the digital processing device to provide an application, the application comprising: (1) a monitoring module configured to (i) receive a plurality of sources of risky activities; and (ii) receive the local risky activities; and (2) visualization module configured to visualize the local risky activities on the computer network. In some embodiments, the risky activities comprise one or more of the following: virus, virus distribution, phishing, intrusion, an attack, malware, threat, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication. In some embodiments, the risky activities comprise a series of risky activities. In some embodiments, the visualization module is further configured to visualize one or more geolocations of the risky activities. In some embodiments, the visualization module is further configured to visualize the risky activities in a network layer. In some embodiments, the one or more sensors are further configured to identify an indicator of compromise of the risky activities. In some embodiments, the one or more sensors are further configured to prevent the risky activities. In some embodiments, the one or more sensors are further configured to remove the risky activities. In some embodiments, the one or more sensors comprise one or more search engines. In some embodiments, the one or more search engines are configured to use a hash function to find the risky activities. In some embodiments, the one or more search engines are configured to use a file name to find the risky activities. In some embodiments, the one or more search engines are configured to use a uniform resource identifier (URL) to find the risky activities. In some embodiments, the one or more search engines are configured to use a keyword to find the risky activities. In some embodiments, the one or more search engines are configured to find the risky activities on a virtual network. In some embodiments, the one or more sensors comprise one or more of the following: one or more computing devices, one or more electronic devices, one or more network devices, one or more mobile devices, one or more appliances, and one or more communication devices.

In various embodiments, described herein include a computer-implemented method for improving data communication security, the method comprising: (1) monitoring, by a computer, a computer network, comprising (i) receiving a plurality of sources of risky activities; and (ii) crawling on the computer network to scan the risky activities taking place on the computer network; (2) visualizing, by a computer, the risky activities or the plurality of sources; and (3) detecting, by a computer, the risky activities. In some embodiments, the plurality of sources comprises one or more domain names. In some embodiments, the plurality of sources comprises one or more domain name systems. In some embodiments, the plurality of sources comprises one or more passive domain systems. In some embodiments, the plurality of sources comprises one or more Internet protocol addresses. In some embodiments, the plurality of sources comprises one or more webpages. In some embodiments, the plurality of sources comprises one or more geolocations. In some embodiments, the plurality of sources comprises one or more honeypots. In some embodiments, the plurality of sources comprises one or more documents. In some embodiments, the plurality of sources comprises one or more files. In some embodiments, the plurality of sources comprises one or more network ports. In some embodiments, the plurality of sources comprises one or more previously detection results. In some embodiments, the plurality of sources of the risky activities is transmitted to the system from a website. In some embodiments, the plurality of sources of the risky activities is transmitted to the system from a web site. In some embodiments, the plurality of sources of the risky activities is transmitted to the system from a honey pot. In some embodiments, the plurality of sources of the risky activities is provided by a user. In some embodiments, the plurality of sources of the risky activities is inferred automatically from past risky activities. In some embodiments, the risky activities comprise one or more of the following: virus, virus distribution, phishing, intrusion, an attack, malware, threat, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication. In some embodiments, the risky activities comprise a series of risky activities. In some embodiments, the computer network comprises one or more social networking media. In some embodiments, the computer network comprises an enterprise computer network. In some embodiments, the computer network comprises a public computer network. In some embodiments, the method further comprises visualizing the risky activities or the plurality of sources in a geolocation. In some embodiments, the method further comprises visualizing the risky activities or the plurality of sources in a network layer. In some embodiments, the detection further comprises identifying an indicator of compromise of the risky activities. In some embodiments, the detection further comprises preventing the risky activities. In some embodiments, the detection further comprises removing the risky activities. In some embodiments, the detection comprises using a search engine. In some embodiments, the search engine is configured to use a hash function to find risky activities. In some embodiments, the search engine is configured to use a file name to find risky activities. In some embodiments, the search engine is configured to use a uniform resource identifier (URL) to find risky activities. In some embodiments, the search engine is configured to use a keyword to find risky activities. In some embodiments, the search engine is configured to find risky activities in a local geolocation. In some embodiments, the search engine is configured to find risky activities on a local network. In some embodiments, the search engine is configured to find risky activities on a virtual network. In some embodiments, the method further comprises using one or more sensors. In some embodiments, the monitoring comprises receiving a sensor signal from the one or more sensors. In some embodiments, the sensor signal comprises a local risky activity. In some embodiments, the method further comprises recording. In some embodiments, the recording comprises recording past risky activities. In some embodiments, the recording comprises recording detection results. In some embodiments, the recording module comprises recording routing of risky activities. In some embodiments, the recording comprises recording context of risky activities into data sets. In some embodiments, the recording comprises recording social context of risky activities.

Monitoring Module

In some embodiments, the system, media, network and method described herein include a monitoring module, or use of the same. In some embodiments, the monitoring module is configured to receive a plurality of sources of risky activities. In some embodiments, the monitoring module is configured to crawl on a computer network to scan the risky activities taking place on the computer network.

In some embodiments, the plurality of sources comprises one or more domain names. In some embodiments, the plurality of sources comprises one or more domain name systems. In some embodiments, the plurality of sources comprises one or more passive domain systems. In some embodiments, the plurality of sources comprises one or more Internet protocol addresses. In some embodiments, the plurality of sources comprises one or more webpages. In some embodiments, the plurality of sources comprises one or more geolocations. In some embodiments, the plurality of sources comprises one or more honeypots. In some embodiments, the plurality of sources comprises one or more documents. In some embodiments, the plurality of sources comprises one or more files. In some embodiments, the plurality of sources comprises one or more network ports. In some embodiments, the plurality of sources comprises one or more previously detection results.

In some embodiments, the plurality of sources of the risky activities is transmitted to the system from a website. In some embodiments, the plurality of sources of the risky activities is transmitted to the system from a web site. In some embodiments, the plurality of sources of the risky activities is transmitted to the system from a honey pot.

In some embodiments, the plurality of sources of the risky activities is provided by a user. In some embodiments, the plurality of sources of the risky activities is inferred automatically from past risky activities.

In some embodiments, the risky activities comprise one or more of the following: virus, virus distribution, phishing, intrusion, an attack, malware, threat, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication.

In some embodiments, the risky activities comprise a series of risky activities.

In some embodiments, the computer network comprises one or more social networking media. In some embodiments, the computer network comprises an enterprise computer network. In some embodiments, the computer network comprises a public computer network.

Visualization Module

In some embodiments, the system, media, network and method described herein include a visualization module. In some embodiments, the visualization module is configured to visualize the risky activities or the plurality of sources.

In some embodiments, the visualization module is further configured to visualize the risky activities or the plurality of sources in a geolocation. In some embodiments, the visualization module is further configured to visualize the risky activities or the plurality of sources in a layer of a network. Non-limiting examples of a layer includes physical, data, network, transport, session, presentation, and application.

Detection Module

In some embodiments, the system, media, network and method described herein include a detection module. In some embodiments, the detection module is configured to detect the risky activities.

In some embodiments, the detection module is further configured to identify an indicator of compromise of the risky activities. In some embodiments, the detection module is further configured to prevent the risky activities. In some embodiments, the detection module is further configured to remove the risky activities.

In some embodiments, the detection module comprises a search engine. In some embodiments, the search engine is configured to use a hash function to find risky activities. In some embodiments, the search engine is configured to use a file name to find risky activities. In some embodiments, the search engine is configured to use a uniform resource identifier (URL) to find risky activities. In some embodiments, the search engine is configured to use a keyword to find risky activities. In some embodiments, the search engine is configured to find risky activities in a local geolocation. In some embodiments, the search engine is configured to find risky activities on a local network. In some embodiments, the search engine is configured to find risky activities on a virtual network.

In some embodiments, the system, media, network and method described herein include a communication module/interface for communicating with one or more sensors. In some embodiments, the monitoring module and/or detection module is configured to receive a sensor signal from the one or more sensors. In some embodiments, the sensor signal comprises a local risky activity.

Recording Module

In some embodiments, the system, media, network and method described herein include a recording module. In some embodiments, the recording module is configured to record past risky activities. In some embodiments, the recording module is configured to record detection results. In some embodiments, the recording module is configured to record routing of risky activities.

In some embodiments, the recording module is configured to record context of risky activities into data sets. In some embodiments, the recording module is configured to record social context of risky activities. Examples of social context include, but not limited to, a user's activities (posting an article/photo/video, sharing an article/photo/video with another user, watching, exploring webpages, enrolling, logging in, purchasing, selling, sending messages/emails, etc.), a connection of a user with another user, and relation in a family/employer/school/group.

In some embodiments, the recording module is configured to record analysis results performed in detection module and/or monitoring module.

Sensors

In some embodiments, the system, media, network and method described herein include one or more sensors, or use of the same. Non-limiting examples of sensors include: computing devices, electronic devices, network devices, mobile devices, portable devices, appliances, communication devices, wearable devices, office equipment, or any objects attached or installed with a device that has capabilities of computing and networking. In some embodiments, sensors are implemented as software running by a remote device on the network or on a virtual network.

In some embodiments, the sensors comprise detection modules for detecting local risky activities. The sensors analyze traffics passing through them and identify risky activities. In additional embodiments, the sensors remotely communicate with a server or a computer. The sensors report the identified risky activities. Furthermore, information (e.g., timestamps, locations, network, domains, IP addresses, indicator of compromise) associated with risky activities is reported by the sensors as well. After the server or the computer receives the report from the sensors, the information of the local risky activities is displayed.

Digital Processing Device

In some embodiments, the platforms, systems, software applications, media, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Non-Transitory Computer Readable Storage Medium

In some embodiments, the platforms, systems, software applications, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application is written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, software applications, media, and methods disclosed herein include software, server, and/or database modules, or use of the same. In view of the disclosure provided herein, software modules are created by techniques known to those of skill in the art using known machines, software, and languages. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, software applications, media, and methods disclosed herein include one or more databases, or use of the same. In view of the disclosure provided herein, those of skill in the art will recognize that many databases are suitable for storage and retrieval of network event data. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way. While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein is employed in practicing the invention.

Example 1—System Design

FIG. 1 shows an example system of the technology disclosed herein. The system comprises a social network monitoring component 101, which monitors activities on social media, such as Facebook, Twitter. In some embodiments, private social networks (e.g., enterprise) are monitored as well. Furthermore, the system comprises a social networking API, allowing social media to utilize the system.

Another component is a visualization module 102, which collects, organizes and presents various types information, such as Maltego, GIS, ArcGIS, Open IOC, STIX, on a display of the system.

An additional component of the system is threat sources 103. A threat source provides information of sources of threats, e.g., DShield, SANS ISC, malwr.com, cbl.abuse-at.org, ReversingLabs, etc. Or, a source can be provided by any third party. In some embodiments, the module of handling threat sources import data with common IOC formats (OpenIOC, STIX).

One more component is passive domain name system (DNS) 104, where inter-server DNS messages are captured by sensors and forwarded to a collection point for analysis. In some embodiments, the component comprises a passive DNS database of Farsight Security. In some applications, security-related telemetry data is collected, or shared by another entity.

The core 105 of the system comprises various analysis tools. Non-limiting examples of the information can be analyzed include: IPQ, URL, DNS, Crawl, Flow, Pcap, Notes, DLP, BGP, ASN, Geo, Fusion, Docs, VT, Malware, Scan. In some embodiments, the core comprises active scanning or crawling functions to find risky activities on networks. In some embodiments, the core comprises an enhanced search engine for finding risky activities on networks, or finding information in an existing security database. The search engine utilizes hash, filename, URL, and/or keywords. In some embodiments, the core comprises an enhanced user interface for a user operate the system or to visualize the desired information. The user interface further shows responsiveness and usability. In some embodiments, the core comprises custom sensor management that collects and manages security information from sensors. In some embodiments, the core comprises a malware analysis pipeline, which analyzes indicators of comprise. In some embodiments, the core comprises comma separate valued (CSV) tools or any similar tools for importing data, exporting data, and organizing data.

Example 2—Analysis Flow

Figure 2:
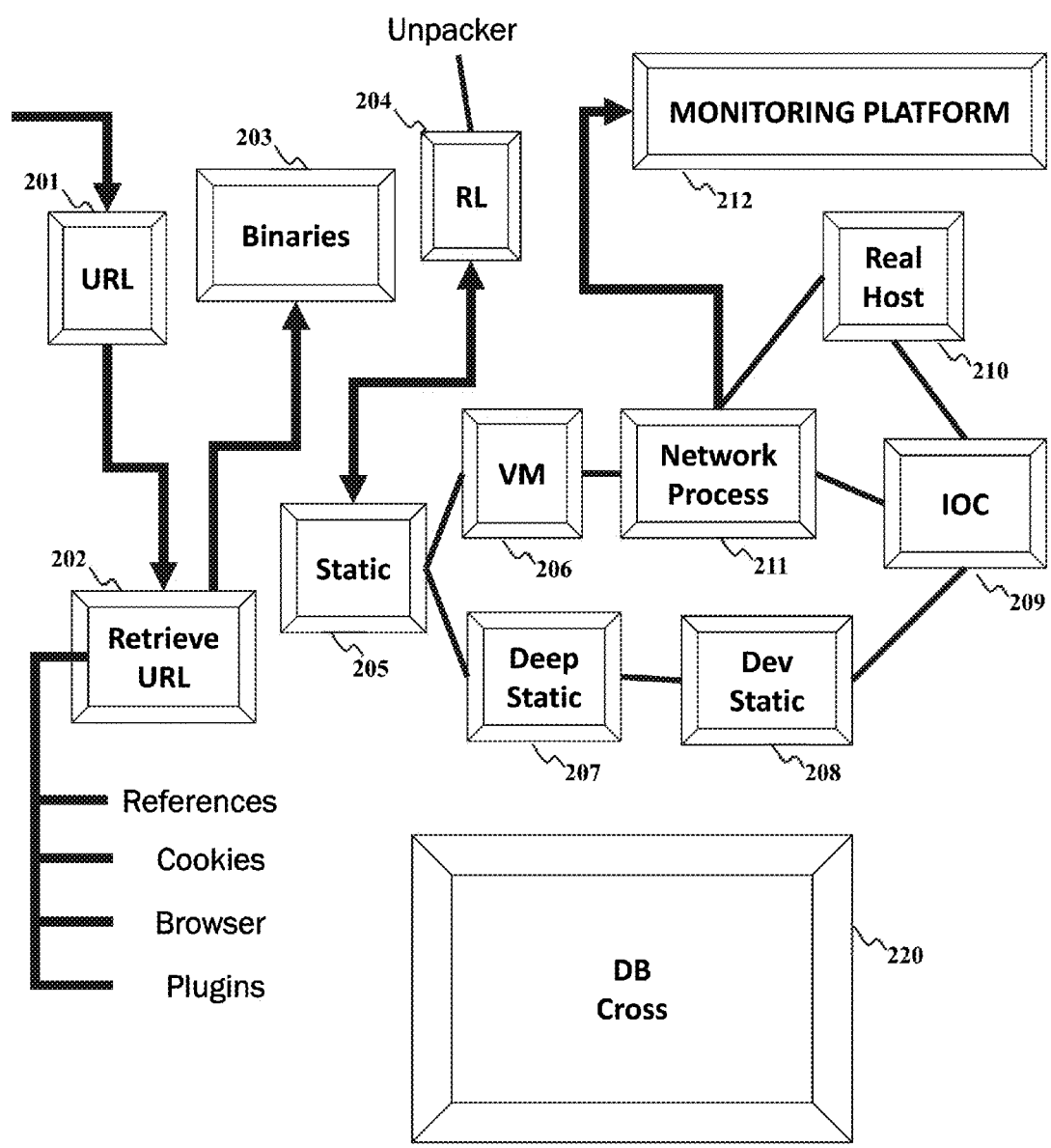
FIG. 2 shows an example flow chart of analysis.

FIG. 2 shows an example flow chart of analysis. A database 220 is shared across all the modules.

In some embodiments, information of risky URLs 201 is provided. The system comprises a module 202 to retrieve these URLs; the information when retrieving URLs can include references, cookies, browser, and/or plugins. The URL information is saved into binary files 203. The URL information can be store statically 205, and accessed by RL module 204. The modules are linked with virtual machine 206, deep static module 207, Dev static module 208, IOC 209, real host 210, and network process 211. The network process further sends information to the monitoring platform 212.

Example 3—Search Network Telemetry

Figure 3:
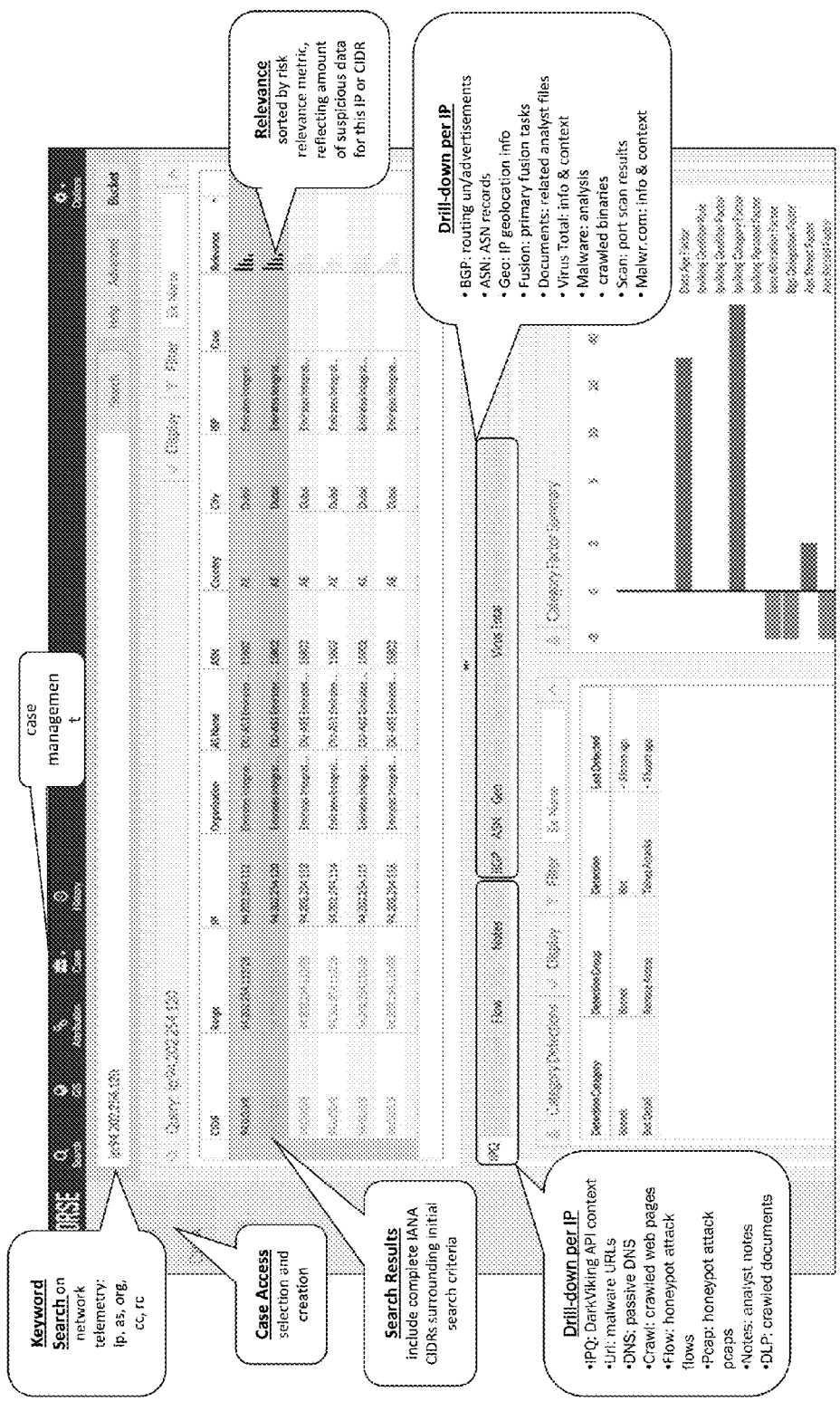
FIG. 3 shows an example of search network telemetry for risk context and fusion.

FIG. 3 shows an example of search network telemetry for risk context & fusion. The Keyword Search on network telemetry comprises ip, as, org, cc, and rc. The Case Access allows users to select and create. The Drill-down per IP presents information of BGP (routing un/advertisements), ASN (ASN records), Geo (IP geolocation information), Fusion (primary fusion tasks), Documents (related analyst files), Virus Total (information and context), Malware (analysis crawled binaries), Scan (port scan results), Malwr.com (information and context), IPQ (the system's API context), Url (malware URLs), DNS (passive DNS), Crawl (crawled web pages), Flow (honeypot attack flows), Pcap (honeypot attack pcaps), Notes (analyst notes), and DLP (crawled documents).

The Search Results includes complete IANA CIDRs surrounding initial search criteria.

The Relevance bars sorts by risk relevance metric, reflecting amount of suspicious data for this IP or CIDR.

The search function of the system mines the databases to derive network telemetry data to be used for user to navigate the search results towards result set of data, which is targeted network telemetry. The search function has complex, intelligent algorithms for relevance and displaying of only relevant data points inside CIDRs, ASes to allow user to navigate a broad result set and drill down to the result data pane. The search function saves features that allows to associate searches into case flows and search history features.

Example 4—Collection Platform

The system comprises a collection platform. The platform analyzes sophisticated data correlation, and intelligence workflow, to bring context to our global cyber threat data set. The platform enables team based analyst collaboration. The platform comprises data exploitation data & information discovery tools. The platform merges social context (e.g. Facebook, LinkedIn, etc.) with global IP events. The platform comprises strategic and tactical intelligence reporting tools. The platform comprises full pcap data from sensor grid.

The core search features of the platform include IP—Internet Protocol (e.g., search for IPv4), AS—AS Number, Keywords (ORG/AS/ISP), etc.

The enhanced search features of the platform include Hash (MD5/SHA1/SHA256); e.g., for URL, Malware, Binary (good/bad). In some embodiments, the features include filename, URL, free-text keywords/tags.

The network features of the platform include MASSCAN (e.g., Shodan, Pentest, PortScan, etc.) and Crawler. In some embodiments, the crawler comprises one or more of the following: DLP (Payloads), URL (Recursive and Non-Recursive), and Active/Passive. Furthermore, the network features include Flow Traffic, PCAP (e.g., download, JavaScript pcap reader, etc.), BGP (e.g., Historical BGP MSG, Active BGP MSG, etc.).

Example 5—Visualization

The technology disclosed herein includes a visualization module to visualize detailed information of scanning and detecting risky activities. Displaying risky activities, the sources, or both is desirable for a system manager to gain a timely, global view of the current security condition of his/her managed computer network and an external computer network. Nevertheless, there is a large volume of information, and the system manager may only have concern for information relevant to his/her managed computer network.

A visualization system disclosed herein can display detailed information of a risky source, such as a range of IP addresses, an organization, a domain name, a disguised domain name, an Internet service provider, a city, a state/province, a country, and/or a risky activity/case detected. Further, the visualization system provides a search/filter tool to enable a user to explore risky activities and risky sources of interest, where the search can based on an IP address, an organization, a domain name, a disguised domain name, an Internet service provider, a city, a state/province, a country, and/or a risky activity. In addition, specific information pertaining to risky sources can be visualized; for example, a context, a malware condition, a passive DNS, a crawling condition, a honeypot attack flow, a honeypot attack traffic, an analyst note, files (e.g., documents, webpages, videos, binaries, etc.) being crawled, routing, advertisements, un-advertisements, ASN records, virus/malware summary (e.g., counts, past history, etc.), TCP/IP port, and OSI network layers can be visualized.

Figure 5:
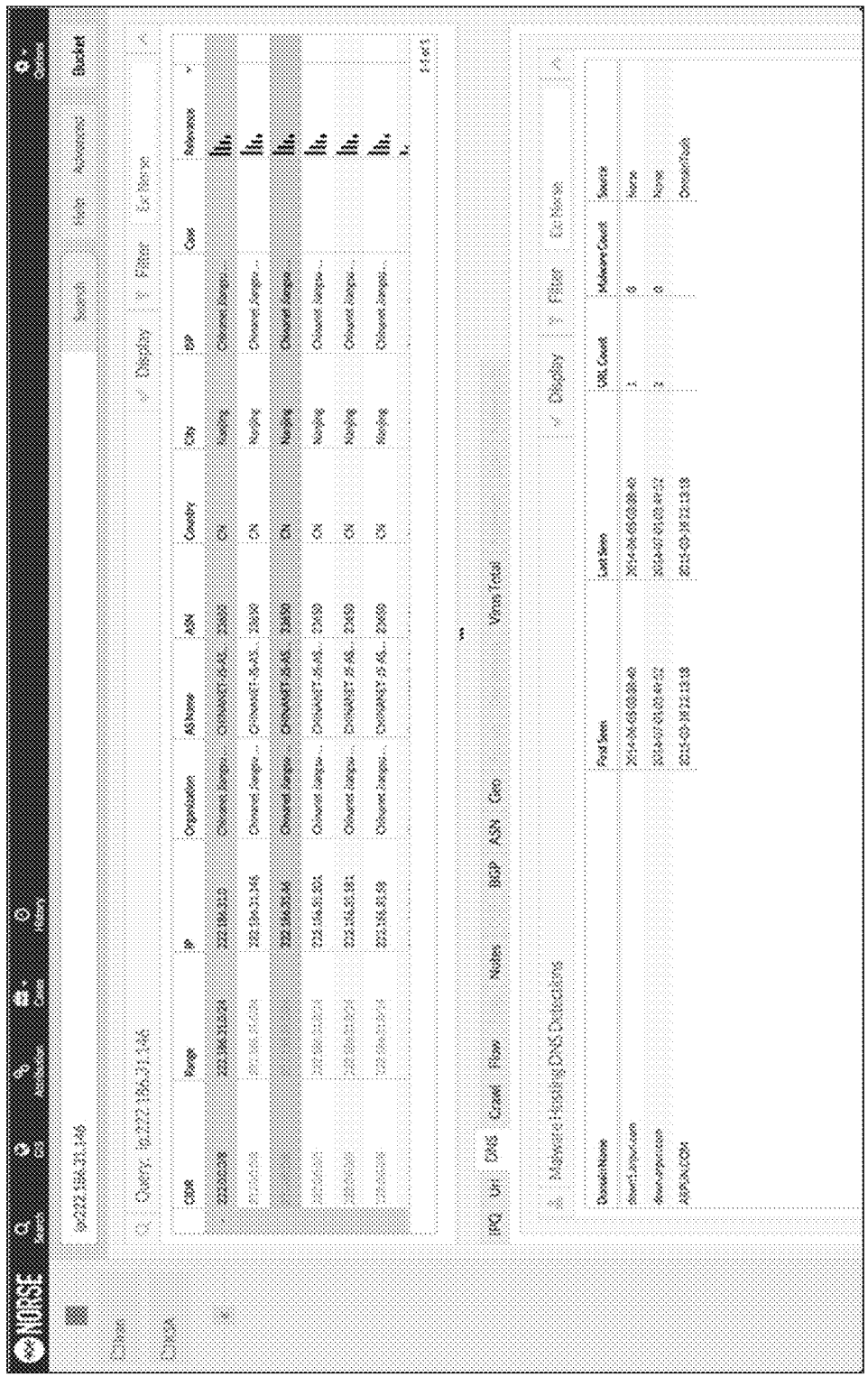
FIG. 5 shows an example of visualizing passive DNS records.
Figure 6:
FIG. 6 shows an example of visualizing crawled web pages, such as status, keywords, SSL cert info.
Figure 10:
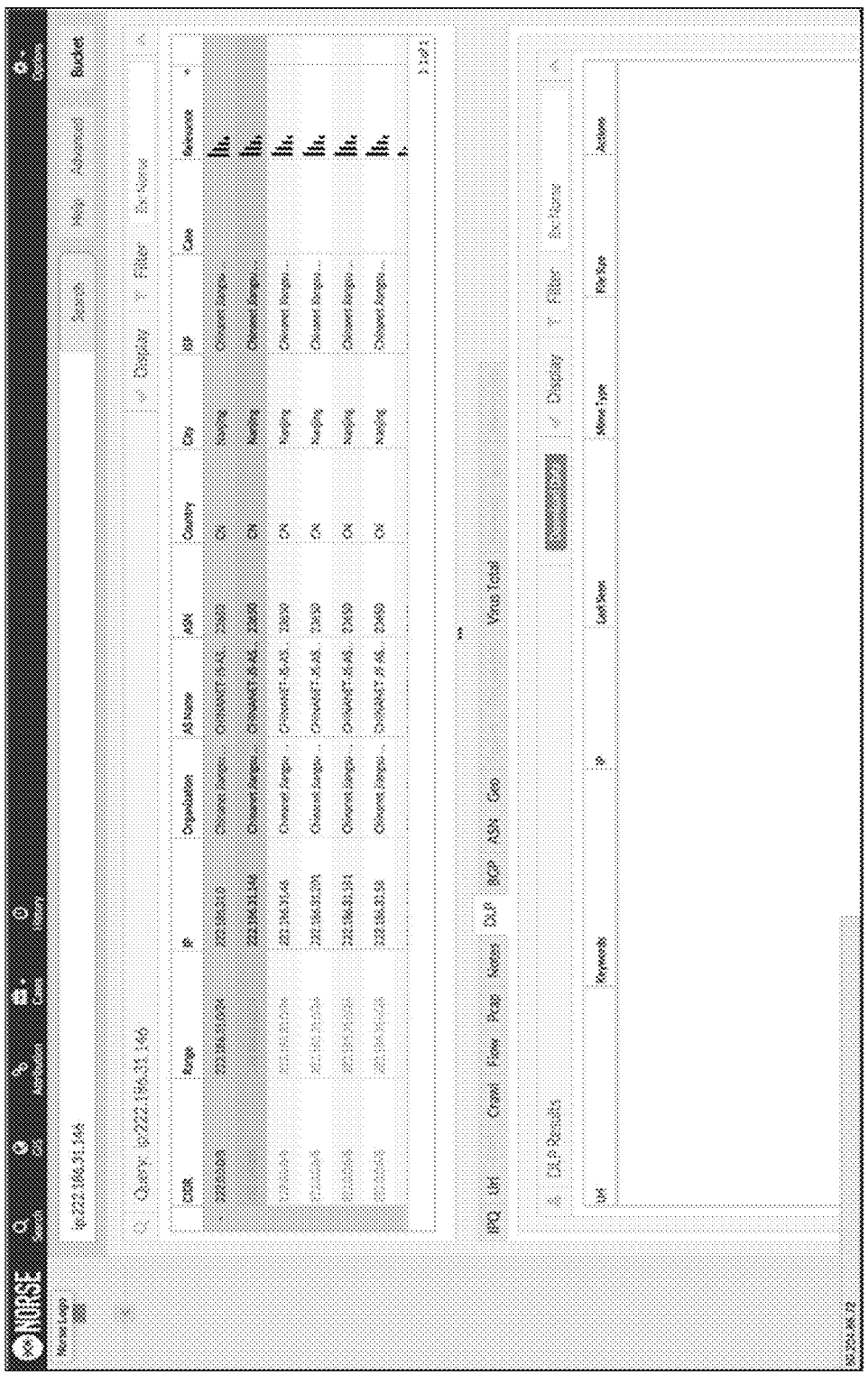
FIG. 10 shows an example of visualizing leaked documents/exfil data.
Figure 12:
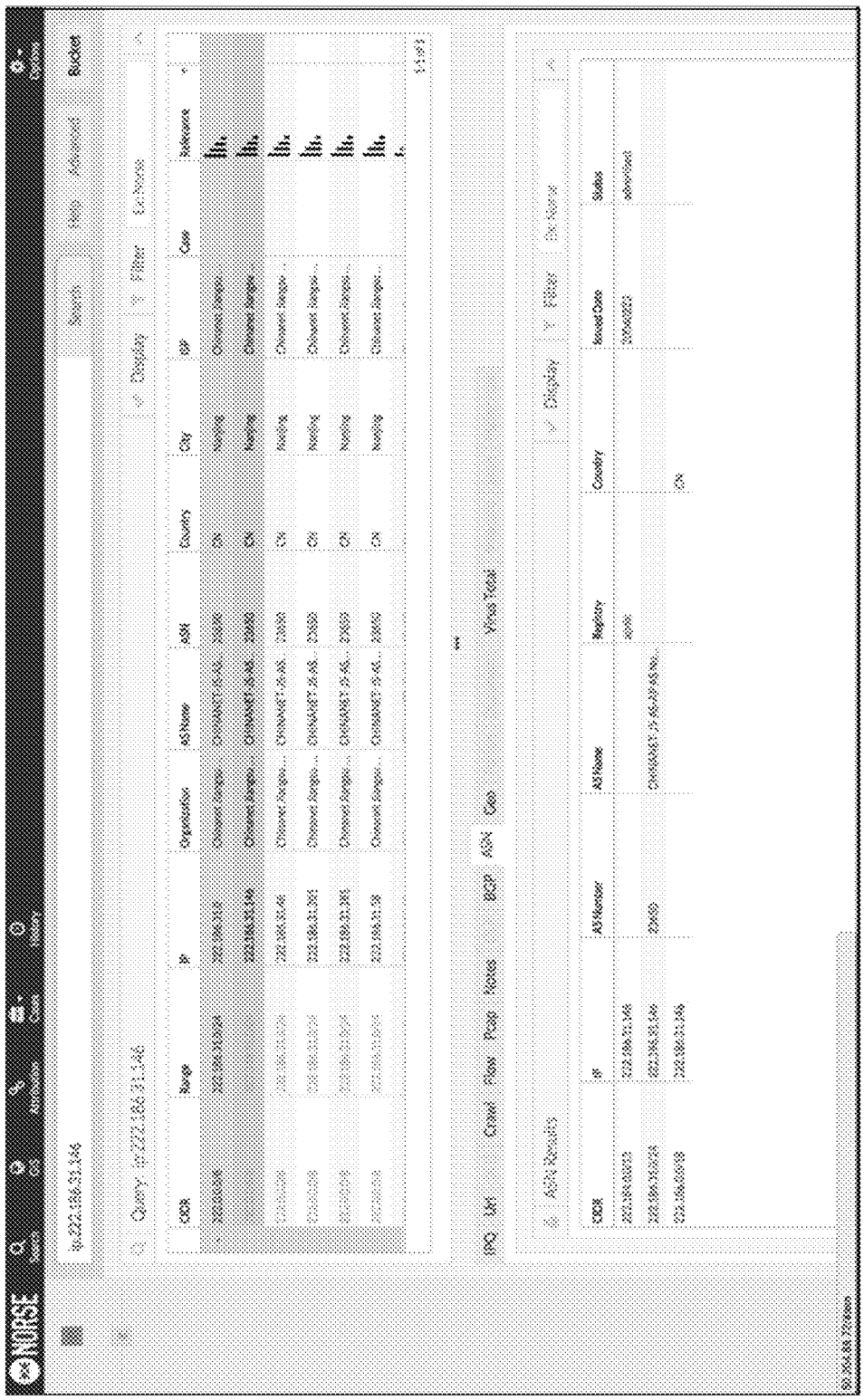
FIG. 12 shows an example of visualizing ASN records.
Figure 14:
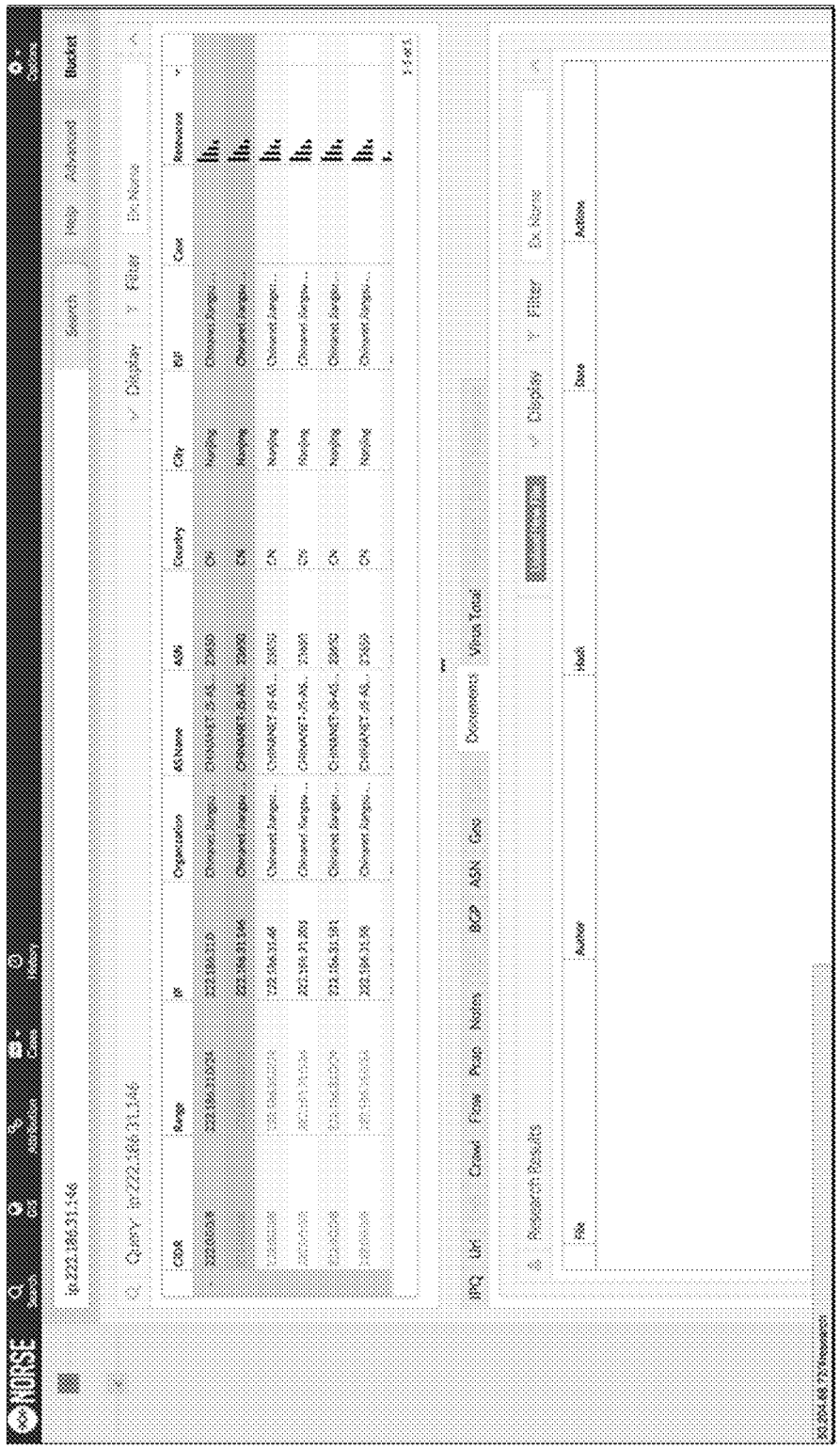
FIG. 14 shows an example of visualizing analyst documents related to IP Address.
Figure 16:
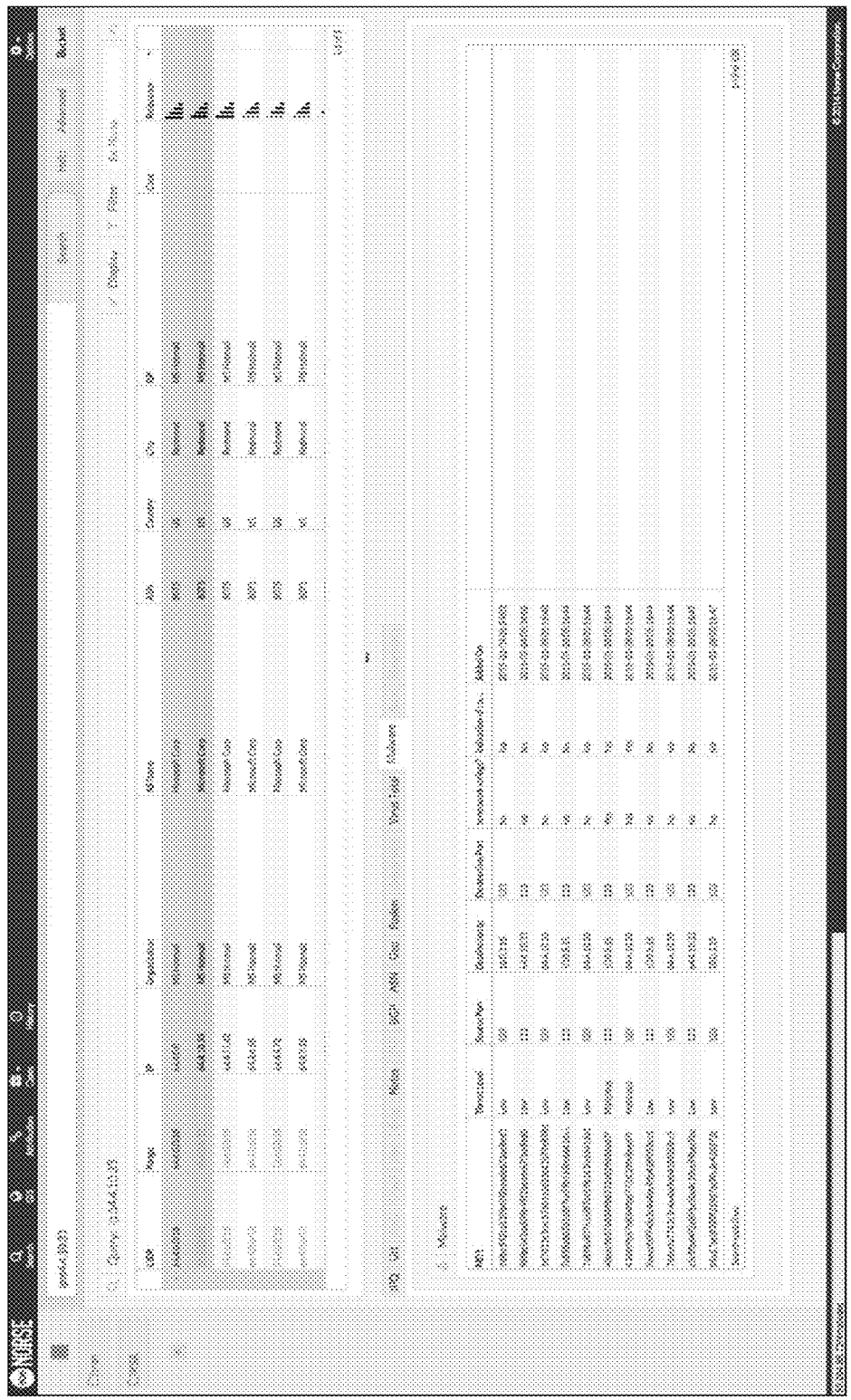
FIG. 16 shows an example of visualizing malware analysis.
Figure 17:
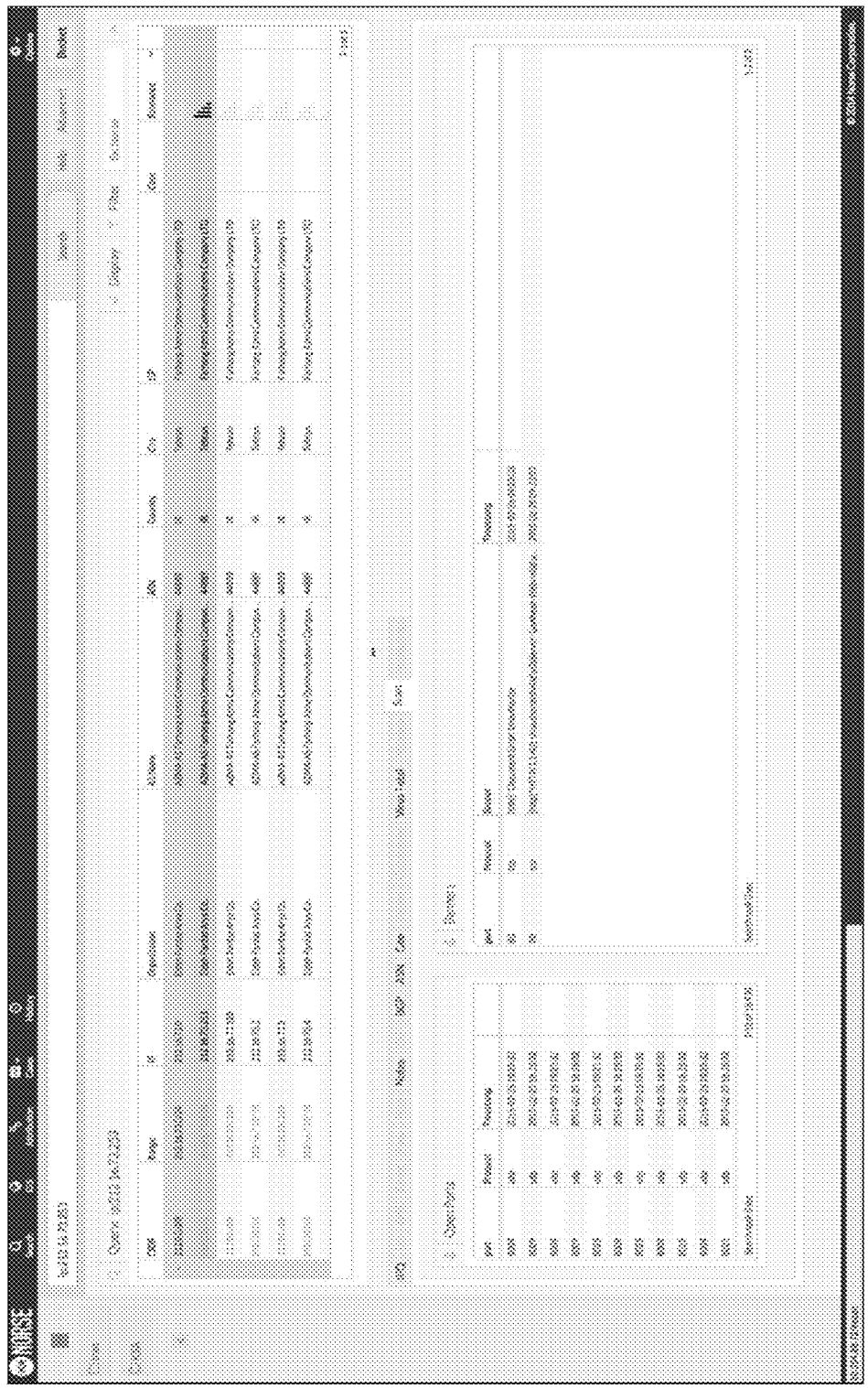
FIG. 17 shows an example of visualizing port scan analysis.
Figure 18:
FIG. 18 shows an example of visualizing information associated with malwr.com.

The system comprises a visualization module. FIG. 4 demonstrates a GUI for visualization of URL information; e.g., malware URLs detected on IP, MIME types, malware types, first and last detection times. FIG. 5 demonstrates a GUI for visualization of passive DNS records; e.g., domain names associated with detected malware, first and last seen times, URL counts, sources of identifying the malware. FIG. 6 demonstrates a GUI for visualization of crawled web pages, such as success/failure of crawling status, keywords, SSL cert info, IP addresses, first and last seen times. FIG. 7 demonstrates a GUI for visualization of flows of attacks against honeypots on a computer network; e.g., timestamps, IANA protocols, source and destination IP addresses, source and destination ports, source and destination countries. FIG. 8 demonstrates a GUI for visualization of packet captures of attacks against honeypots on network; e.g., filenames, source and destination IP addresses, source and destination ports, link types, lengths, and timestamps. FIG. 9 demonstrates a GUI for visualization of analyst notes; in some embodiments, a note was created by an analyst, and in some embodiments, a note was created by a machine based on natural language processing technologies. FIG. 10 demonstrates a GUI for visualization of leaked documents/exfil data. FIG. 11 demonstrates a GUI for visualization of BGP route advertisements and un-advertisements; e.g., CIDR addresses, IP addresses, AS number, AS names, registries, countries, issued date, and status. FIG. 12 demonstrates a GUI for visualization of ASN records; e.g., CIDR addresses, IP addresses, AS number, AS names, registries, countries, issued date, and status. FIG. 13 demonstrates a GUI for visualization of IP geolocation; e.g., a range of IP addresses, a latitude, a longitude, a city, a state/province, a zip code, a country, and a map. FIG. 14 demonstrates a GUI for visualization of analyst documents related to IP Address. FIG. 15 demonstrates a GUI for visualization of various aspects of virus information and context; e.g., virus names, virus keywords, virus values/counts, URLs, scan times, and total counts. FIG. 16 demonstrates a GUI for visualization of malware analysis; for example, hashes (e.g., MD5), threat levels, source and destination ports and IP addresses, in network strings, and added on times. FIG. 17 demonstrates a GUI for visualization of port scan analysis; for example, ports, protocols, timestamps, and banners. FIG. 18 demonstrates a GUI for visualization of information associated with Malwr.com; for example, anti-virus statistics, anti-virus tools/providers, and signatures.

What is claimed is:

1. A method, implemented by a computer, for improving data communication security, the method comprising:
   (a) monitoring data traffic by (i) receiving a plurality of sources of risky activities; (ii) crawling a computer network to scan the risky activities taking place on the computer network, wherein the plurality of sources comprises one or more domain names and one or more Internet protocol (IP) addresses and wherein at least a portion of the plurality of sources is inferred automatically; and (iii) capturing inter-server domain name system (DNS) messages;
   (b) using the plurality of sources and crawling results to detect the risky activities, infer potential risky sources, and prevent or remove the risky activities; and
   (c) visualizing detected risky activities, the plurality of sources, and the potential risky sources by providing an enhanced user interface comprising:
      (i) a search tool for searching the risky activities, the plurality of sources, and the potential risky sources to obtain search results;
      (ii) visualization of search results comprising classless inter-domain routing (CIDR), range, Internet protocol address, organization, autonomous system (AS) name, autonomous system number (ASN), country, city, Internet service provider (ISP), and relevance, wherein the search results are selectable to provide drill-down information associated with an IP address; and
      (iii) visualization of the drill-down information comprising any two or more of: malware URLs detected on the IP address, crawled web pages, flows of attacks against honeypots, packet captures of honeypot attacks, border gateway protocol (BGP) route advertisements, and virus information.

2. The method of claim 1, wherein the plurality of sources further comprises at least one of the following: one or more domain name systems, one or more passive domain systems, one or more webpages, one or more geolocations, one or more honeypots, one or more documents, one or more files, one or more network ports, one or more previously detected results.

3. The method of claim 1, wherein the plurality of sources is transmitted to the system from a website and from a honey pot.

4. The method of claim 1, wherein the plurality of sources is provided by a user.

5. The method of claim 1, wherein the plurality of sources is inferred automatically from past risky activities.

6. The method of claim 1, wherein the risky activities comprise one or more of the following: virus, virus distribution, phishing, intrusion, an attack, malware, threat, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication.

7. The method of claim 1, wherein the risky activities comprise a series of risky activities.

8. The method of claim 1, wherein the computer network comprises one or more social networking media.

9. The method of claim 1, further comprising visualizing the detected risky activities, the plurality of sources, and the potential risky sources in a geolocation.

10. The method of claim 1, further comprising visualizing the detected risky activities, the plurality of sources, and the potential risky sources in a network layer.

11. The method of claim 1, wherein the searching is based on a hash function, a file name, a uniform resource identifier (URL), a keyword, or a local geolocation.

12. The method of claim 1, further comprising receiving a sensor signal from one or more sensors and the sensor signal comprises a local risky activity.

13. The method of claim 1, further comprising recording past risky activities, detection results, routing of risky activities, and context of risky activities.

14. The method of claim 13, wherein the context of risky activities comprises social context of risky activities.

15. Non-transitory computer-readable storage media encoded with a computer program including instructions executable by a digital processing device to create an application, the application comprising:
(a) a monitoring module (i) receiving a plurality of sources of risky activities; (ii) crawling a computer network to scan the risky activities taking place on the computer network, wherein the plurality of sources comprises one or more domain names and one or more Internet protocol (IP) addresses and wherein at least a portion of the plurality of sources is inferred automatically by the monitoring module; and (iii) capturing inter-server domain name system (DNS) messages;
(b) a detection module using the plurality of sources and crawling results to detect the risky activities, infer potential risky sources, and prevent or remove the risky activities; and
(c) a visualization module visualizing detected risky activities, the plurality of sources, and the potential risky sources by providing an enhanced user interface comprising:
(i) a search tool for searching the risky activities, the plurality of sources, and the potential risky sources to obtain search results;
(ii) visualization of the search results comprising classless inter-domain routing (CIDR), range, Internet protocol address, organization, autonomous system (AS) name, autonomous system number (ASN), country, city, Internet service provider (ISP), and relevance, wherein the search results are selectable to provide drill-down information associated with an IP address; and
(iii) visualization of the drill-down information comprising any two or more of malware URLs detected on the IP address, crawled web pages, flows of attacks against honeypots, packet captures of honeypot attacks, border gateway protocol (BGP) route advertisements, and virus information.

16. The media of claim 15, wherein the plurality of sources further comprises at least one of the following: one or more domain name systems, one or more passive domain systems, one or more webpages, one or more geolocations, one or more honeypots, one or more documents, one or more files, one or more network ports, one or more previously detected results.

17. The media of claim 15, wherein the plurality of sources is transmitted to the system from a website and from a honey pot.

18. The media of claim 15, wherein the plurality of sources is provided by a user.

19. The media of claim 15, wherein the plurality of sources is inferred automatically from past risky activities.

20. The media of claim 15, wherein the risky activities comprise one or more of the following: virus, virus distribution, phishing, intrusion, an attack, malware, threat, fraud, identity theft, crime, cyberbullying, denial-of-service, hacking, digital piracy, intellectual property infringement, pornography production or distribution, controlled substance trade, terrorism, insurrection, smuggling, disobedience, money laundering, and unencrypted data communication.

21. The media of claim 15, wherein the risky activities comprise a series of risky activities.

22. The media of claim 15, wherein the computer network comprises one or more social networking media.

23. The media of claim 15, wherein the visualization module further visualizes the detected risky activities, the plurality of sources, and the potential risky sources in a geolocation.

24. The media of claim 15, wherein the visualization module further visualizes the detected risky activities, the plurality of sources, and the potential risky sources in a network layer.

25. The media of claim 15, wherein the searching is based on a hash function, a file name, a uniform resource identifier (URL), a keyword, or a local geolocation.

26. The media of claim 15, further comprising one or more sensors, wherein the monitoring module receives a sensor signal from the one or more sensors and the sensor signal comprises a local risky activity.

27. The media of claim 15, wherein the application further comprises a recording module recording past risky activities, detection results, routing of risky activities, and context of risky activities.

28. The media of claim 27, wherein the context of risky activities comprises social context of risky activities.

* * * * *